US012549923B2

(12) United States Patent
Shrivastava et al.

(10) Patent No.: US 12,549,923 B2
(45) Date of Patent: Feb. 10, 2026

(54) VERIFICATION OF USER EQUIPMENT LOCATION IN NON-TERRESTRIAL NETWORK

(71) Applicant: QUALCOMM Incorporated, San Diego, CA (US)

(72) Inventors: Avinash Shrivastava, Telangana State (IN); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 18/068,961

(22) Filed: Dec. 20, 2022

(65) Prior Publication Data
US 2024/0205641 A1 Jun. 20, 2024

(51) Int. Cl.
*H04W 4/021* (2018.01)
*G01S 5/10* (2006.01)
(Continued)

(52) U.S. Cl.
CPC ............... *H04W 4/021* (2013.01); *G01S 5/10* (2013.01); *H04W 4/023* (2013.01); *H04W 84/06* (2013.01)

(58) Field of Classification Search
CPC ..... H04W 4/021; H04W 4/023; H04W 84/06; H04W 4/029; H04W 64/00; H04W 92/18;
(Continued)

(56) References Cited

U.S. PATENT DOCUMENTS 9,671,785 B1 6/2017 Bhatia et al.
9,854,398 B1 12/2017 Arunkumar et al.
(Continued)

FOREIGN PATENT DOCUMENTS

WO WO-2022084401 A2 4/2022
WO 2022157018 A1 7/2022
(Continued)

OTHER PUBLICATIONS

Atis, "Non-Terrestrial Networks 5G Integration", 2 pages, Retrieved on Mar. 12, 2024, https://www.atis.org/initiatives/non-terrestrial-networks-ntn-5g-integration/.
(Continued)

*Primary Examiner* — Diane D Mizrahi
*Assistant Examiner* — Jing Gao
(74) *Attorney, Agent, or Firm* — QUALCOMM Incorporated

(57) ABSTRACT

Techniques for verifying a user equipment (UE) location in a non-terrestrial network (NTN) are disclosed. In some embodiments, such techniques may involve receiving location data of the target UE; obtaining one or more locations of one or more other UEs that are within a sidelink communication range of the target UE; receiving sidelink measurements obtained by the one or more other UEs relative to the target UE or by the target UE obtained for the one or more other UEs; and verifying the location data of the target UE (e.g., a location of the target UE) based at least on the sidelink measurements and the one or more locations of the one or more other UEs. The location verification may ensure that the target UE only accesses an NTN that is allowed to serve the location of the target UE.

30 Claims, 9 Drawing Sheets

(51) Int. Cl.
*H04W 4/02* (2018.01)
*H04W 84/06* (2009.01)

(58) Field of Classification Search
CPC ......... H04W 8/005; H04W 4/02; H04W 4/40; H04W 84/18; H04W 4/80; H04W 64/006; H04W 4/027; H04W 24/10; H04W 88/02; H04W 56/0015; H04W 88/04; H04W 4/44; H04W 4/46; H04W 64/003; H04W 72/25; H04W 4/21; H04W 40/20; H04W 72/40; H04W 12/63; H04W 28/0215; H04W 72/1215; H04W 28/0226; H04W 48/04; G01S 5/10; G01S 19/215; G01S 5/0072; G01S 5/0236; G01S 5/0284; G01S 5/0289; G01S 5/14; G01S 19/05; G01S 19/51; G01S 5/0263; G01S 5/0268; G01S 19/42; G01S 19/396; G01S 5/0295
See application file for complete search history.

(56) References Cited

U.S. PATENT DOCUMENTS

| | | |
|---|---|---|
| 10,551,478 B2 | 2/2020 | Tseng et al. |
| 10,652,845 B2 | 5/2020 | Sheng et al. |
| 2017/0070971 A1 | 3/2017 | Wietfeldt et al. |
| 2018/0231648 A1 | 8/2018 | Zhang |
| 2021/0263166 A1* | 8/2021 | Zheng ................. G08G 1/0116 |
| 2023/0358843 A1 | 11/2023 | Ghimire et al. |

FOREIGN PATENT DOCUMENTS

| | | | |
|---|---|---|---|
| WO | 2022220933 A2 | 10/2022 | |
| WO | WO-2023274518 A1 * | 1/2023 | .......... H04W 64/006 |
| WO | WO-2023126181 A1 * | 7/2023 | .......... G01S 5/0236 |
| WO | 2024019863 A1 | 1/2024 | |
| WO | WO-2024032911 A1 * | 2/2024 | ............ H04W 84/06 |

OTHER PUBLICATIONS

International Search Report and Written Opinion—PCT/US2023/078926—ISA/EPO—Feb. 23, 2024.
Nuutinen J-P., "Non-Terrestrial Network Realities Call for New 5G Testing Approaches", Spirent, Dec. 6, 2021, 6 pages, https://www.spirent.com/blogs/non-terrestrial-network-realities-call-for-new-5g-testing-approaches.
Sharetechnote, "5G/NR—NTN", 13 pages, Retrieved on Mar. 12, 2024, https://www.sharetechnote.com/html/5G/5G_NTN.html.
Softbank, "SoftBank's NTN Solutions", 9 pages, Retrieved on Mar. 12, 2024, https://www.softbank.jp/en/corp/philosophy/technology/special/ntn-solution/.
Co-pending U.S. Appl. No. 17/244,779, inventor Shuman; Mohammed, filed on Apr. 29, 2021.

* cited by examiner

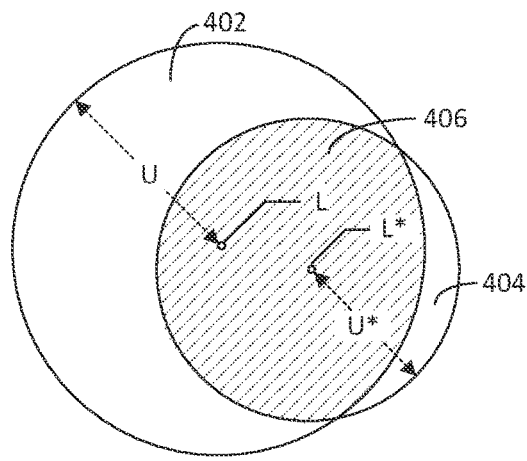
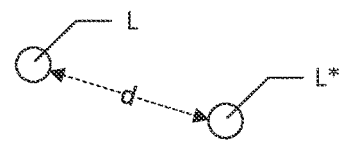
FIG. 4A   FIG. 4B
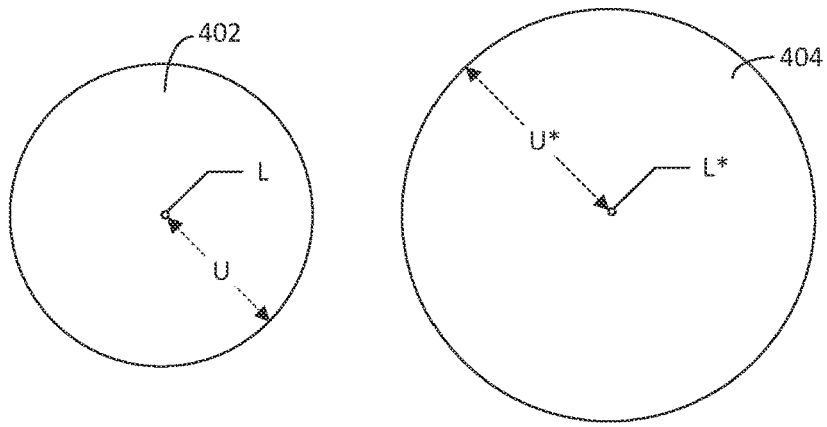
FIG. 4C
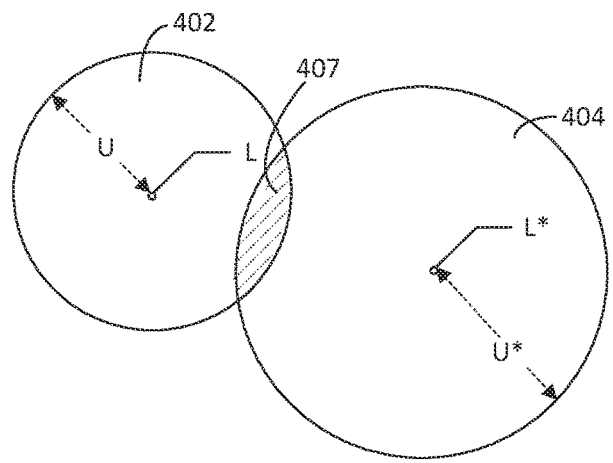
FIG. 4D

VERIFICATION OF USER EQUIPMENT LOCATION IN NON-TERRESTRIAL NETWORK

BACKGROUND

1. Field of Disclosure

The present disclosure relates generally to the field of wireless communications, and more specifically to verification of a location of a user equipment (UE) in a non-terrestrial network (NTN).

2. Description of Related Art

Terrestrial or ground-based communication networks and infrastructures such as a wireless local area network (WLAN) or a Third Generation Partnership Project (3GPP)-based (e.g., 4G or 5G) wireless network can provide wide coverage for communications, signaling, and positioning with UEs and other wireless-enabled user devices.

NTNs can provide connectivity using airborne or space-borne nodes (e.g., satellite or satellite segments in space or the stratosphere) and thereby extend or provide an alternate to functionalities of terrestrial networks. Integration of NTNs with terrestrial networks provides a way to solve coverage problems that ground-based infrastructures alone cannot address. For instance, NTNs can have maritime applications or provide service to other areas that may be difficult or costly with a terrestrial network. As another example, NTNs can position UEs using a global navigation satellite system (GNSS) such as Global Positioning System (GPS) or other NTN satellite system, although this may not always be reliable.

Public safety, security, and regulatory applications can also be possible with NTN-based positioning. For instance, to access an NTN, a UE or any user device may be required by national regulations to be located in a country or region served by the NTN. To verify the UE's location, the NTN and/or UE may need to perform NTN-based positioning with increased reliability.

BRIEF SUMMARY

In one aspect of the present disclosure, a method of validating a location of a target user equipment (UE) that is configured to access a non-terrestrial network (NTN) is disclosed. In some embodiments, the method includes: receiving, from the target UE, location data indicative of a location of the target UE; obtaining one or more locations of one or more UEs that are within a sidelink communication range of the target UE; receiving sidelink measurements obtained by the one or more UEs relative to the target UE or by the target UE obtained relative to the one or more UEs; and verifying the location data of the target UE based at least on the sidelink measurements and the one or more locations of the one or more UEs.

In another aspect of the present disclosure, an apparatus is disclosed. In some embodiments, the apparatus includes: one or more transceivers configured to communicate with a target user equipment (UE); memory; and one or more processors communicatively coupled to the one or more transceivers and the memory, and configured to: receive location data of the target UE; obtain one or more locations of one or more UEs that are within a sidelink communication range of the target UE; receive sidelink measurements obtained by the one or more UEs relative to the target UE or by the target UE obtained for the one or more UEs; and verify the location data of the target UE based at least on the sidelink measurements and the one or more locations of the one or more UEs.

In some embodiments, the apparatus includes: means for receiving location data of a target user equipment (UE); means for obtaining one or more locations of one or more UEs that are within a sidelink communication range of the target UE; means for receiving sidelink measurements obtained by the one or more UEs relative to the target UE or by the target UE obtained for the one or more UEs; and means for verifying the location data of the target UE based at least on the sidelink measurements and the one or more locations of the one or more UEs.

In another aspect of the present disclosure, a non-transitory computer-readable apparatus is disclosed. In some embodiments, the non-transitory computer-readable apparatus includes a storage medium, the storage medium comprising a plurality of instructions configured to, when executed by one or more processors, cause a computerized apparatus to: receive location data of a target user equipment (UE); obtain one or more locations of one or more UEs that are within a sidelink communication range of the target UE; receive sidelink measurements obtained by the one or more UEs relative to the target UE or by the target UE obtained for the one or more UEs; and verify the location data of the target UE based at least on the sidelink measurements and the one or more locations of the one or more UEs.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIGS. 4A-4D are illustrate example scenarios that may lead to a validation or no validation of the provided location of a target UE.

Figure 1:
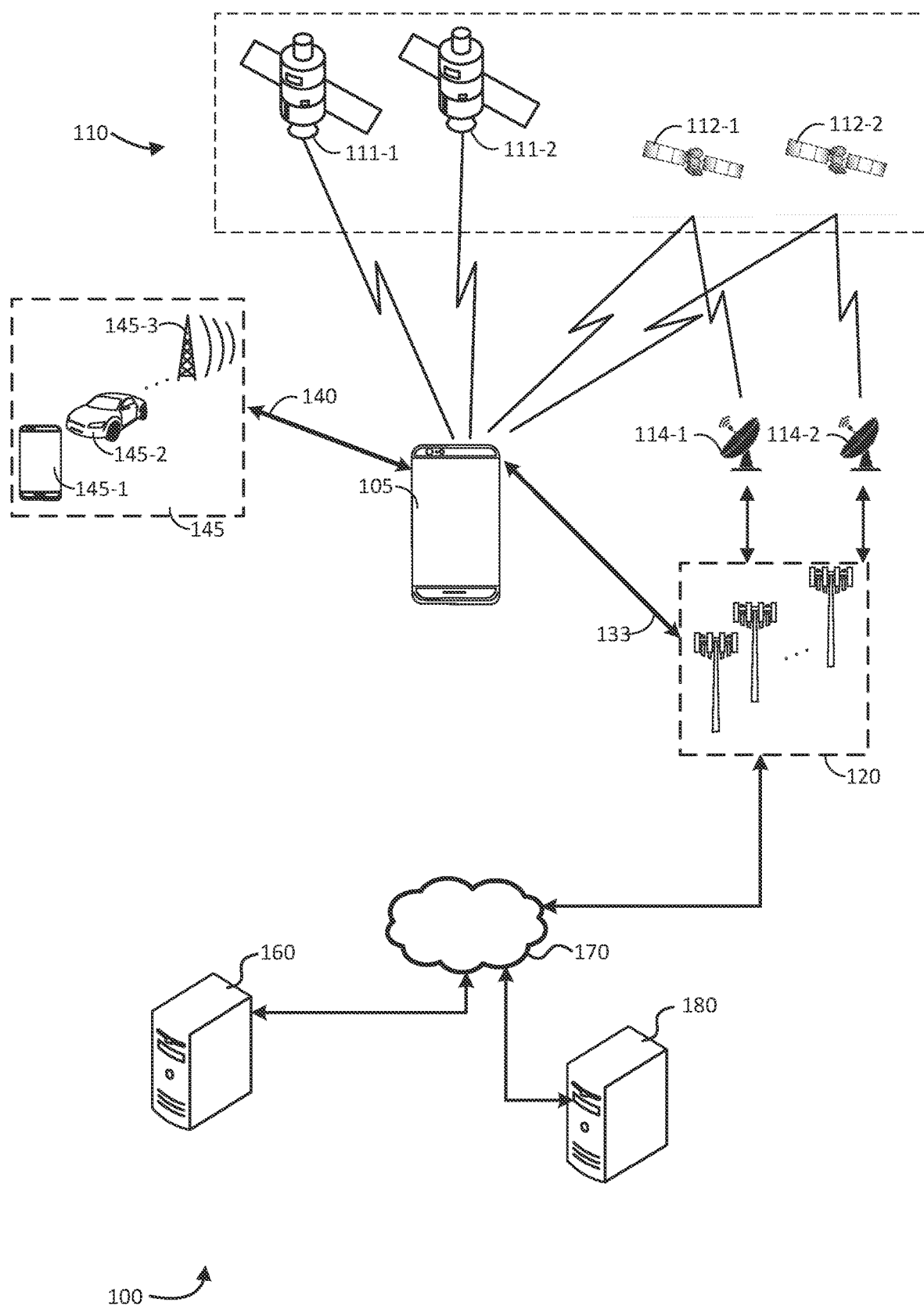
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 210 may be indicated as 210-1, 210-2, 210-3 etc. or as 210*a*, 210*b*, 210*c*, etc. When referring to such an element using only the first number, any instance of the element is to be understood (e.g., element 210 in the previous example would refer to elements 210-1, 210-2, and 210-3 or to elements 210*a*, 210*b*, and 210*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO. EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may refer to absolute location determination, relative location determination, ranging, or a combination thereof. Such positioning may include and/or be based on timing, angular, phase, or power measurements, or a combination thereof (which may include RF sensing measurements) for the purpose of location or sensing services.

NTNs may need to position UEs and verify their locations, e.g., using GNSS-based positioning. However, one issue with positioning for an NTN is that location spoofing can allow false locations of a UE to be reported to the NTN to, e.g., appear to be in a different country or regulatory region. This is possible because, unlike a Terrestrial Network (TN) where a serving terrestrial cell for a UE can confirm UE location to within around 100 meters to 5 kilometers (km) (depending on TN cell size), an NTN serving radio cell coverage area can extend from 400 km to over 1000 km when satellites are used, which will not always be able to confirm UE location in one particular country or region. The true location of the UE may be spoofed in such cases (or simply be in error), allowing a UE to appear to be in different country or region than the true country or region of the UE, and thereby bypass national regulations and allow the UE to gain access to a network (e.g., a core network) in the different country or region. This may allow a UE to evade lawful interception in the true country or region of the UE as well as access services that may be prohibited to the UE.

Using GNSS to locate a UE may not always be reliable due the possibility of GNSS measurements being spoofed or GNSS signals being spoofed. In some cases, an NTN could inadvertently be allowing users in other countries or regulatory authorities (e.g., near a border) to access the NTN since satellites can serve a large geographic location (e.g., 100-1000 miles wide) and can inadvertently provide service to a bordering country or region.

To these ends, techniques for verifying or validating a location of a target UE that is configured to access an NTN are needed. As will be discussed below, according to some embodiments of this disclosure, a location server may cross-check a target UE's location based on sidelink messages or sidelink measurements reported by other UEs near the target UE. According to some other embodiments of this disclosure, a location server may cross-check a target UE's location based on sidelink messages or sidelink measurements reported by the target UE or by other UEs. Additional details will follow after an initial description of relevant systems and technologies.

FIG. 1 is a simplified illustration of a positioning system 100 in which a UE 105, location server 160, and/or other components of the positioning system 100 can use the techniques provided herein for, e.g., verifying a location of UE 105 in a non-terrestrial network (NTN), according to an embodiment. The techniques described herein may be implemented by one or more components of the positioning system 100. The positioning system 100 can include: a UE 105; one or more satellites 110 (also referred to as space vehicles (SVs)), which may include Global Navigation Satellite System (GNSS) satellites 111 (e.g., satellites of the Global Positioning System (GPS), GLONASS, Galileo, Beidou, etc.) and/or NTN satellites 112 (which are configured to act as communication nodes and may be separate and distinct from other SVs); one or more NTN gateways 114 (sometimes referred to herein simply as gateways 114, earth stations 114, or ground stations 114); base stations 120; location server 160; network 170; and external client 180. Generally put, the positioning system 100 can estimate a location of the UE 105 based on RF signals received by and/or sent from the UE 105 and known locations of other components (e.g., GNSS satellites 111, NTN satellites 112, base stations 120) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUS), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. Optionally, in certain implementations, an access point (AP) not shown may be communicatively coupled to the network 170, and may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Accessing the location server 160 or the network 170 may also be done via the NTN satellite(s) 112 and earth station(s) 114, e.g., when direct access to base stations 120 are not available. Additionally or alternatively, because APs also may be communicatively coupled with the network 170 in certain implementations, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g., with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). In some cases, a base station 120 may contain no TRPs and may access UEs 105 only via one or more NTN gateways 114 and one or more NTN satellites 112. In such cases, the base station 120 may employ a wired (or wireless connection) to each NTN gateway 114 or an NTN gateway 114 may be part of the base station 120.

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IOT), Enhanced Mobile Broadband (eMBB), or others) that may provide access for different types of devices. In some cases, the term "cell" may refer to a portion of a geographic coverage area (e.g., a sector) over which the logical entity operates. With NTN access, a radio cell may be static (e.g., for a geostationary NTN satellite 112) or may have a coverage area that moves over the surface of the Earth (e.g., for a low Earth orbit (LEO) or medium Earth orbit (MEO) NTN satellite 112).

Satellites 110 may be utilized for positioning of the UE 105 in one or more ways. For example, satellites 110 (also referred to as space vehicles (SVs)) may be part of a Global Navigation Satellite System (GNSS) such as the Global Positioning System (GPS), GLONASS, Galileo or Beidou.

Positioning using RF signals from GNSS satellites may comprise measuring multiple GNSS signals at a GNSS receiver of the UE 105 to perform code-based and/or carrier-based positioning, which can be highly accurate. Additionally or alternatively, some of the satellites 110, such as NTN satellites 112, may be utilized for NTN-based positioning, in which NTN satellites 112 may functionally operate as TRPs (or TPs) of a network (e.g., LTE and/or NR network) and may be communicatively coupled with network 170, e.g., via earth station(s) 114 configured for communication with base station(s) 120. In particular, reference signals (e.g., PRS) transmitted by NTN satellites 112 for NTN-based positioning may be similar to those transmitted by base stations 120, and may be coordinated by a location server 160. In some embodiments, NTN satellites 112 used for NTN-based positioning may be different than those used for GNSS-based positioning. In some embodiments NTN nodes may include non-terrestrial vehicles such as airplanes, balloons, drones, etc., which may be in addition or as an alternative to NTN satellites.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105 to a 5G core network.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g., data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, base stations 120). The estimated location of the UE 105 can be estimated geometrically (e.g., using multiangulation and/or multilateration), based on the distance and/or angle measurements, along with a known position of the one or more components.

Although terrestrial components such as base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the UE 105, such as infrared signals or other optical technologies.

Mobile devices 145 may comprise other UEs communicatively coupled with a cellular or other mobile network (e.g., network 170). When one or more other mobile devices 145 comprising UEs are used in the position determination of a particular UE 105, the UE 105 for which the position is to be determined may be referred to as the "target UE," and each of the other mobile devices 145 used may be referred to as a "reference UE" or an "anchor UE." For position determination of a target UE, the respective positions of the one or more anchor UEs may be known and/or jointly determined with the target UE. Direct communication between the one or more other mobile devices 145 and UE 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., UE 105) may be facilitated using measurements from one or more anchor devices (e.g., mobile devices 145).

According to some embodiments, such as when the UE 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP and which can include communication using NR or LTE sidelink signaling. The UE 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the UE 105 (e.g., using LTE or NR sidelink signaling) and may be used to determine the position of the UE 105 using techniques similar to those used by base stations 120 (e.g., using multiangulation and/or multilateration). It can be further noted that mobile devices 145 (which may include V2X devices) and/or base stations 120 may be used together (e.g., in a WWAN positioning solution) to determine the position of the UE 105, according to some embodiments.

An estimated location of UE 105 can be used in a variety of applications—e.g., to assist direction finding or navigation for a user of UE 105 or to assist another user (e.g., associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g., a latitude and longitude and possibly altitude) or a relative location of UE 105 (e.g., a location expressed as distances north or south, east or west and possibly above or below some other known fixed location (including, e.g., the location of a base station 120) or some other location such as a location for UE 105 at some known previous time, or a location of a mobile device 145 (e.g., another UE) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g., including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., 95% confidence).

The external client 180 may be a web server or remote application that may have some association with UE 105 (e.g., may be accessed by a user of UE 105) or may be a server, application, or computer system providing a location service to some other user or users which may include obtaining and providing the location of UE 105 (e.g., to enable a service such as friend or relative finder, or child or pet location). Additionally or alternatively, the external client 180 may obtain and provide the location of UE 105 to an emergency services provider, government agency, etc.

Figure 2:
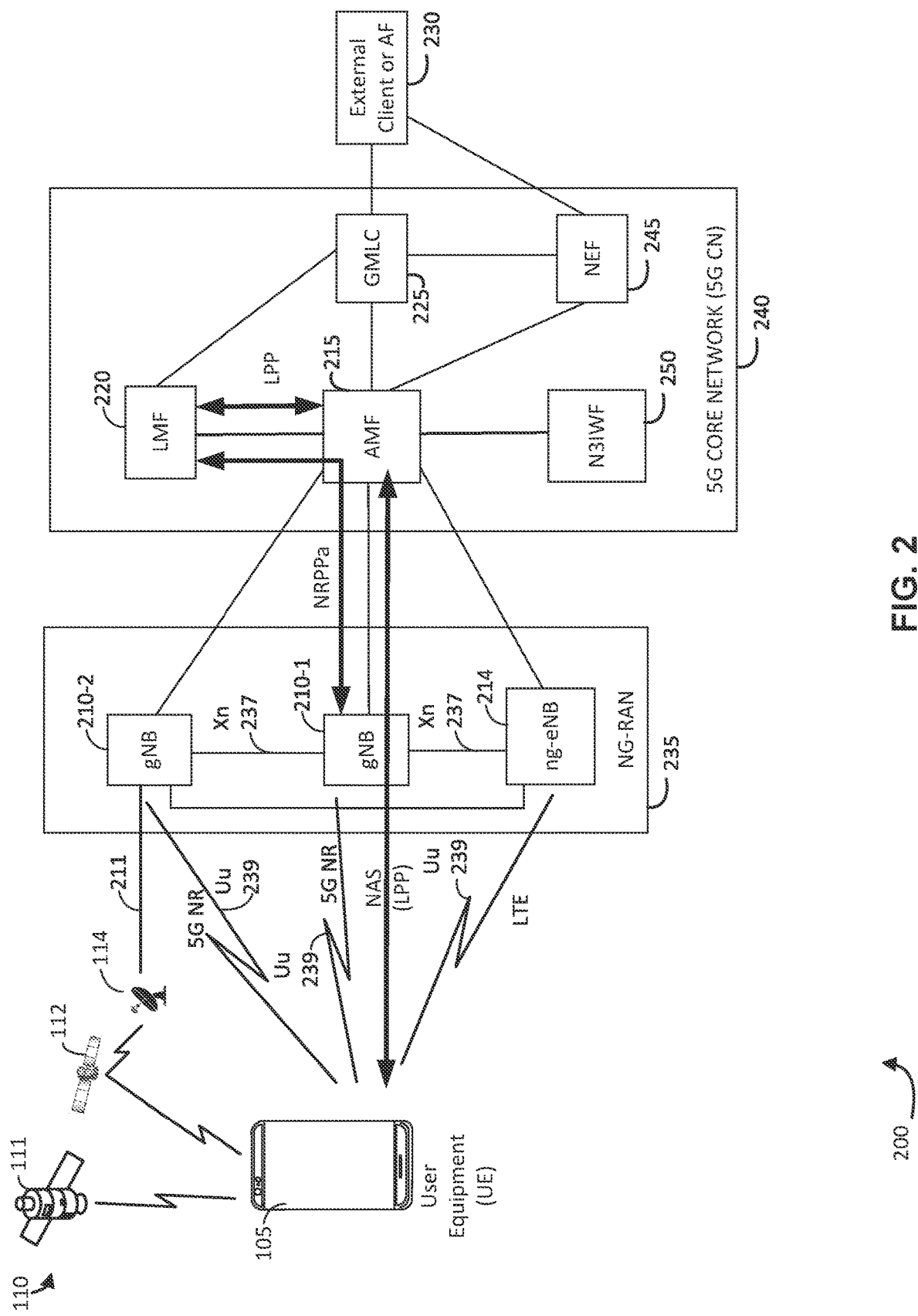
FIG. 2 is a diagram of a positioning system, illustrating an embodiment of a positioning system (e.g., the positioning system of FIG. 1) implemented within a 5G NR communication network.

As previously noted, the example positioning system 100 can be implemented using a wireless communication network, such as an LTE-based or 5G NR-based network. FIG. 2 shows a diagram of a positioning system 200, illustrating an embodiment of a positioning system (e.g., positioning system 100) implementing 5G NR. The positioning system 200 may be configured to determine the location of a UE 105 by using access nodes, which may include NR NodeB (gNB) 210-1 and 210-2 (collectively and generically referred to herein as gNBs 210) and/or ng-eNB 214 to implement one or more positioning methods. The gNBs 210 and/or the ng-eNB 214 may correspond with base stations 120 of FIG. 1. Optionally, access nodes may include a WLAN (not shown) that corresponds with one or more access points. Optionally, the positioning system 200 additionally may be configured to determine the location of a UE 105 by using an LMF 220 (which may correspond with location server 160) to implement the one or more positioning methods. Here, the positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The positioning system 200 may further utilize information from satellites 110. As previously indicated, satellites 110 may comprise GNSS satellites 111 from a GNSS system like Global Positioning System (GPS) or similar system (e.g., GLONASS, Galileo, Beidou, Indian Regional Navigational Satellite System (IRNSS)). Additionally or alternatively, satellites 110 may comprise NTN satellites 112 that may be communicatively coupled with the LMF 220 (e.g., via at least an earth station 114 and gNB 210) and may operatively function as (or similarly to) a TRP (or TP) in the NG-RAN 235. NTN satellites 112 may then be in communication with one or more gNB 210, and UE 105 may be configured to communicate with the NG-RAN 235 via the satellites 112, earth station(s) 114, and gNB(s) 210. The gNB(s) 210 may be separate from earth station(s) 114. The gNB(s) 210 alternatively may include or may be combined with one or more earth station(s) 114, e.g., using a split architecture. Earth station(s) 114 may be shared by more than one gNB 210. An earth station 114 may be dedicated to just one Space Vehicle Operator (SVO) and to one associated constellation of NTN satellites 112 and hence may be owned and managed by the SVO. Earth station(s) 114 may be included within a gNB 210, e.g., as a gNB-DU within a gNB 210, which may occur when the same SVO or the same mobile network operator (MNO) owns both the gNB 210 and the included earth station(s) 114. Earth station(s) 114 may communicate with NTN satellite(s) 112 using control and user plane protocols that may be proprietary to an SVO. The control and user plane protocols between earth station(s) 114 and NTN satellite(s) 112 may: (i) establish and release earth station 114 to NTN satellite 112 communication link(s) 211, including supporting authentication and ciphering; (ii) update SV software and firmware; (iii) perform SV Operations and Maintenance (O&M); (iv) control radio beams and radio cells (e.g., direction, power, on/off status) and mapping between radio beams/radio cells and earth station uplink (UL) and downlink (DL) payload; and (v) assist with handoff of an NTN satellite 112 or radio cell to another earth station 114.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the positioning system 200. Similarly, the positioning system 200 may include a larger (or smaller) number of satellites 110, gNBs 210, ng-eNBs 214, Access and mobility Management Functions (AMF)s 215, external clients 230, and/or other components. The illustrated connections that connect the various components in the positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network. The UE 105 may include a single entity or may include multiple entities, such as in a personal area network where a user may employ audio, video and/or data I/O devices, and/or body sensors and a separate wireline or wireless modem.

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210 (e.g., which may occur via an NTN satellite 112 and an NTN gateway 114), which may provide wireless communications access to the 5G CN 240 on behalf of the UE 105 using 5G NR. The wireless interface between base stations (gNBs 210 and/or ng-eNB 214) and the UE 105 may be referred to as a Uu interface 239 when the access is terrestrial or as a Uu interface over link 211 when the access uses an NTN. 5G NR radio access may also be referred to as NR radio access or as 5G radio access. In FIG. 2, the serving gNB for UE 105 is assumed to be gNB 210-1, although other gNBs (e.g., gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g., directly or indirectly via other gNBs 210 and/or other ng-eNBs. An ng-eNB 214 may provide LTE wireless access and/or evolved LTE (eLTE) wireless access to UE 105— e.g., which may be terrestrial or may occur via an NTN satellite 112 and an NTN gateway 114 with NTN access. Some gNBs 210 (e.g., gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the positioning system 200, such as the LMF 220 and AMF 215.

In optional implementations, the positioning system 200 may also include one or more WLANs (not shown) which may connect to a Non-3GPP InterWorking Function (N3IWF) 250 in the 5G CN 240 (e.g., in the case of an untrusted WLAN). For example, the WLAN may support IEEE 802.11 Wi-Fi access for UE 105 and may comprise one or more Wi-Fi APs. Here, the N3IWF 250 may connect to other elements in the 5G CN 240 such as AMF 215. In some embodiments, WLAN may support another RAT such as Bluetooth. The N3IWF 250 may provide support for secure access by UE 105 to other elements in 5G CN 240 and/or may support interworking of one or more protocols used by WLAN and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN may connect directly to elements in 5G CN 240 (e.g., AMF 215 as shown by the dashed line in FIG. 2) and not via N3IWF 250. For example, direct connection of WLAN to 5GCN 240 may occur if WLAN is a trusted WLAN for 5GCN 240 and may be enabled using a Trusted WLAN Interworking Function (TWIF) (not shown in FIG. 2) which may be an element inside WLAN. It is noted that while only one WLAN is shown in FIG. 2, some embodiments may include multiple WLANs.

Access nodes may comprise any of a variety of network entities enabling communication between the UE 105 and the AMF 215. As noted, this can include gNBs 210, ng-eNB 214, NTN satellites 112, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN.

In some embodiments, an access node, such as a gNB 210, ng-eNB 214, NTN satellite 112, and/or WLAN (alone or in combination with other components of the positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, NTN satellite 112) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, NTN satellite 112, or WLAN) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214, NTN satellites 112 and/or WLAN, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g., a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In some embodiments, a sidelink positioning protocol (SLPP) may be used between a UE 105 and another UE 145 to coordinate positioning of the UE 105 and the other UE 145 using sidelink signaling and possibly using sidelink PRS transmission and sidelink PRS measurement by the UE 105 and/or the other UE 145. For example, SLPP procedures may be used to determine a range between UE 105 and the other UE 145 and/or a bearing of one of UE 105 and the other UE 145 relative to the other of UE 105 and the other UE 145. In such cases, UE 105 and/or the other UE 145 may receive assistance data or positioning instructions from LMF 220 and/or may send sidelink positioning measurements or location results (e.g., a range between UE 105 and the other UE 145 and/or a bearing of one of UE 105 and the other UE 145 relative to other of UE 105 and the other UE 145) to LMF 220 using LPP messages, SLPP messages or SLPP messages embedded in LPP messages.

In the case of UE 105 access to a WLAN, LMF 220 may use NRPPa and/or LPP to obtain a location of UE 105 in a similar manner to that just described for UE 105 access to a gNB 210 or ng-eNB 214. Thus, NRPPa messages may be transferred between a WLAN and the LMF 220, via the AMF 215 and N3IWF 250 to support network-based positioning of UE 105 and/or transfer of other location information from WLAN to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN for UE 105 to support UE assisted or UE based positioning of UE 105 by LMF 220.

In a positioning system 200, positioning methods can be categorized as being "UE assisted". "UE based" or "network based". With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAOA), AoD, or Timing Advance (TA) for gNBs 210, ng-eNB 214, and/or one or more access points for WLAN. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN).

With a network based position method, one or more base stations (e.g., gNBs 210 and/or ng-eNB 214), one or more APs (e.g., in WLAN), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station 120, NTN satellite 112 or other UE 145), the positioning may be categorized as DL based. On the other hand, if positioning is based solely on signals transmitted by the UE 105 (which may be received by a base station 120 or other UE 145, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs 145. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, AoA and RTT measurements. Other reference signals that can be used for positioning (UL, DL, or DL-UL) may include a Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Positioning Scenarios

Figure 3:
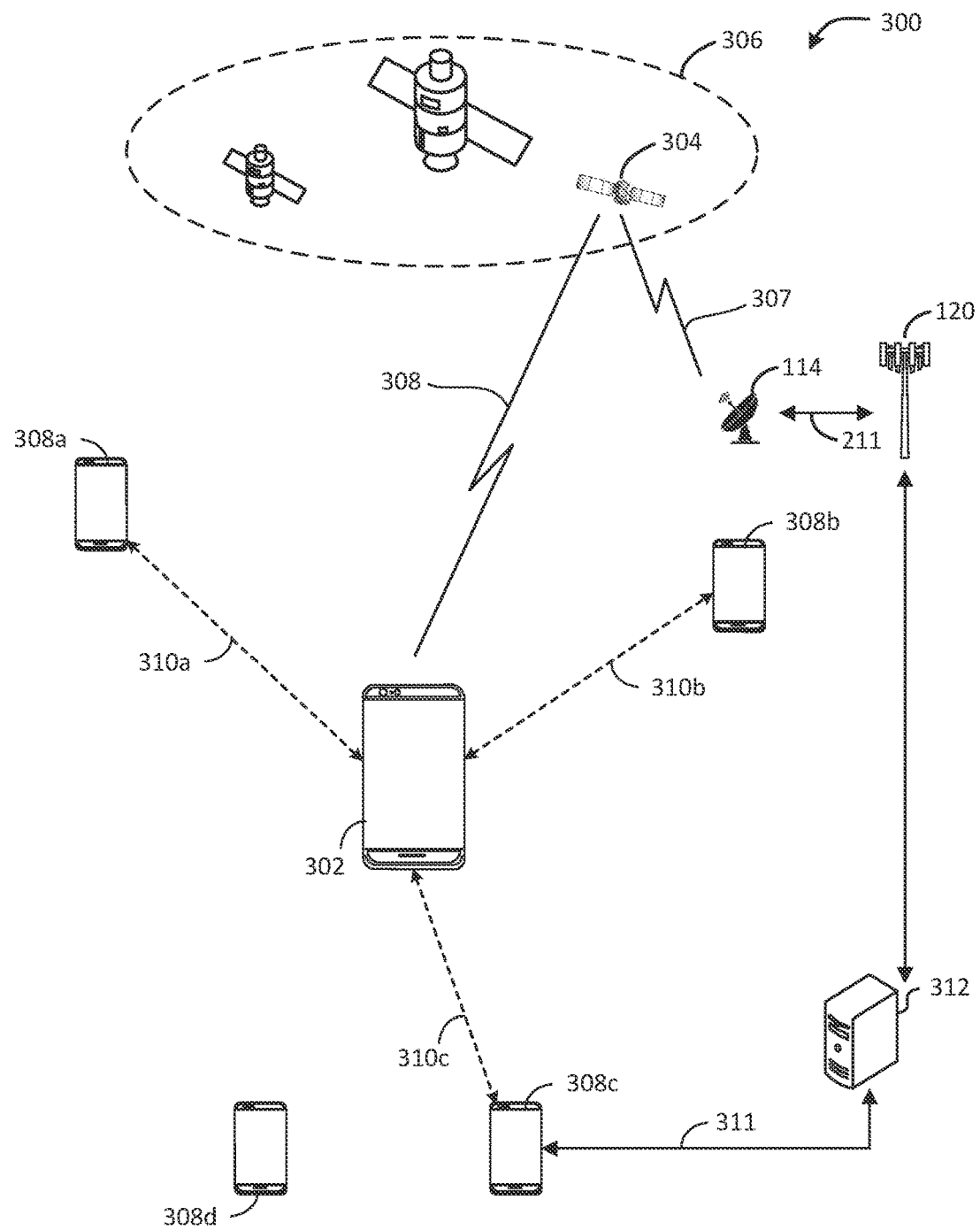
FIG. 3 is an illustration of a positioning scenario for a target user equipment (UE) configured for positioning with a non-terrestrial network (NTN) without direct base station access, according to some embodiments.

FIG. 3 is an illustration of a positioning scenario 300 for a target user equipment (UE) 302 configured for positioning in a non-terrestrial network (NTN) including one or more SVs 306 without direct base station access, according to some embodiments described herein. In some implementations, the NTN may include an access node 304, such as an NTN satellite (which may be an example of an NTN satellite 112). In some configurations of the positioning scenario 300, there may not be direct signaling between the target UE 302 and a particular base station 120 (e.g., gNB or an eNB) such as that depicted in FIG. 1 or 2 (e.g., via communication link 133). An example signaling path for UE 302 using NTN access in the positioning scenario 300, which may be referred to as an NTN link, may include: base station 120 (e.g., gNB or eNB) to an earth station 114 via a terrestrial (e.g., wired or wireless) communication link 211, earth station 114 to an NTN satellite (NTN uplink via link 307 to, e.g., access node 304), and NTN satellite to a target UE 302 (NTN downlink via link 308). The target UE 302 may refer to a requestor UE configured for communication with the access node 304 of the NTN, for seeking access to the NTN. For example, the target UE 302 may seek access to the NTN for voice, data and other communication services, and accurate positioning of UE 302 may then be needed to verify the country or regulatory entity for satellite coverage access.

In the positioning scenario 300, the target UE 302 may be configured to perform or may be in data communication with a location server 312 (e.g., location server 160, LMF 220) via the example signaling path using the NTN mentioned above. One or more other nearby UEs 308a-308c as well as a UE 308d may be configured to perform sidelink positioning with other UEs and/or may be in data communication with the location server 312 similarly using the NTN or via a terrestrial data communication link. One such example data communication link 311 is shown with UE 308c for illustrative purposes, which may be a terrestrial link or an NTN link (e.g., similar to the NTN link for UE 302 described above). As will be discussed below, these nearby one or more UEs (e.g., one or more of UEs 308a-308c) may be useful for verifying the location of the target UE 302 seeking NTN access.

In some implementations, data communication between the target UE 302 and the nearby one or more UEs 308a-308c may be accomplished with sidelink signals and sidelink messages sent or received via communication links, e.g., communication links 310a-310c. In some cases, not all nearby UEs may be in sidelink communication with the target UE 302, such as UE 308d, because UE 308d may not be capable of sidelink communication, may not be capable of measuring certain positioning parameters (e.g., AoA, AoD), may not be part of the terrestrial network that target UE 302 is in, may not be known (e.g., its location) by the network, may be too distant from the target UE 302, may be moving too fast to be a reliable measure of location, etc. Thus, in some scenarios, only some nearby UEs such as one or more of UEs 308a-308c may be relevant for verification of the location of the target UE 302.

In some embodiments, the target UE 302 may be requested by the location server 312 (or by an AMF such as AMF 215) to periodically transmit (or broadcast) sidelink discovery messages to nearby UEs, such as one or more of UEs 308a-308c whose positions may be known. The location server 312 (or AMF) may initially have information on reported locations of the target UE 302 and the one or more other known UEs, e.g., previously reported locations of the target UE 302 and/or the one or more other known UEs stored on a memory associated with the location server 312 (or AMF). However, if the target UE 302 seeks NTN access, the location (and associated uncertainty) provided by the target UE 302 may not initially be considered trustworthy by the location server 312 (or AMF).

In some embodiments, the sidelink discovery messages transmitted by UE 302 may be received by and reported from these one or more other UEs (e.g., one or more of UEs 308a-308c) to the location server 312. In some cases, the one or more other UEs may also report (or have previously reported) their locations to the location server 312. The location server 312 may also obtain identification information of the one or more other UEs that report their locations (e.g., an ID, a Subscription Permanent Identifier (SUPI), Generic Public Subscription Identifier (GPSI) or Temporary Mobile Subscriber Identity (TMSI) of a UE). The one or more other UEs may also obtain measurements with respect to the target UE 302, e.g., AoA, AoD, range, or direction and/or bearing between the target UE 302 and the one or more other UEs based on the received sidelink discovery messages and/or based on other sidelink messages or sidelink signals received from the target UE 302. The measurements may be coordinated using SLPP messages exchanged between target UE 302 and the one or more other UEs or may not rely on use of SLPP. The one or more other UEs 308a-308c may provide the measurements (or location results like range and bearing determined by the other UEs from the measurements) to the location server 312 as part of the reporting to the location server 312. In some implementations, the location server 312 (or an AMF) may determine the one or more UEs 308a-308c based on their proximity to a location reported by UE 302 and may request each of the one or more UEs 308a-308c to each report the measurements (or location results) obtained for sidelink messages received from UE 302.

In some other embodiments, however, it may be the target UE 302 that receives sidelink signals and sidelink messages (e.g., discovery messages) from the other UEs 308a-308c and that reports, to the location server 312, information such as measurements based on the received sidelink signals and messages and/or reports identification(s) for the other nearby UEs (e.g., one or more of UEs 308a-308c) from which sidelink signals and messages were received. Reported identification information may include information that identifies each of the other nearby UEs (e.g., an ID, SUPI, GPSI or TMSI of a UE). In these other embodiments, the one or more other UEs, known to be proximate to a location reported by the target UE 302, may be requested by the location server 312 (or by an AMF) to periodically transmit sidelink discovery messages and/or other sidelink signals to the target UE 302. Alternatively, the one or more other UEs may transmit (or broadcast) sidelink discovery messages and/or other sidelink signals to support other Proximity-based services and may not require a request from the location server 312 (or an AMF) to transmit (or broadcast) sidelink discovery messages. In that case, only some UEs nearby to the target UE 302 may transmit (or broadcast) sidelink discovery messages (e.g., UEs 308a and 308b), while other UEs nearby to UE 302 may not transmit (or broadcast) these messages (e.g., UEs 308c and 308d). The location server 312 (or an AMF) may also request the target UE 302 to report the measurements and/or identification information for the other UEs from which sidelink signals and/or messages were received. This is in contrast to the previous embodiments in which the one or more other UEs report information (e.g., measurements) to the location server 312.

In some embodiments, both approaches above may be combined such that the target UE 302 and the one or more nearby UEs may both report the measurements based on sidelink communications, location information, and/or identification information.

In some embodiments, the location server 312 may cross-check the provided location of the target UE 302 based on information relating to the one or more other UEs (which the location server 312 may identify using, e.g., identification information reported by the target UE 302 or identification information obtained when the one or more other UEs report sidelink discovery messages or locations as described above). The information relating to the one or more other UEs may include known locations of the one or more other UEs proximate to the reported location of the target UE 302. In some cases, such locations of the one or more other UEs may have been previously reported to the location server 312 by the one or more other UEs or previously obtained by the location server 312 (e.g., using UE assisted and/or network based position methods) and stored (e.g., as geodetic locations) by the location server 312. The known or reported locations of the one or more other UEs may have an associated error and/or uncertainty, and thus the known or reported locations in some cases may be approximate locations. The one or more other UEs may have reported or obtained locations ($L_1, L_2 \ldots L_n$) (assuming there are n other UEs) and uncertainties ($U_1, U_2 \ldots U_n$). While this information may have been stored from previous reports, in some cases, the locations and/or uncertainties of the one or more other UEs may have been reported or obtained at or near the time when the reported location of target UE 302 needs to be verified.

In one implementation, target UE 302 may report a location L with uncertainty U (e.g., where location L and uncertainty U may be obtained by target UE 302 using GNSS). Location server 312 may verify location L according to whether it is consistent with locations ($L_1, L_2 \ldots L_n$) and uncertainties ($U_1, U_2 \ldots U_n$) for the other UEs. The location L may be considered consistent (and thereby verified) if: (i) it is within a threshold distance of each of or some of locations ($L_1, L_2 \ldots L_n$) for the other UEs; (ii) it is within a threshold distance of the mean location of the other UEs (e.g., the average of the n locations ($L_1, L_2 \ldots L_n$)); (iii) an uncertainty area for the target UE 302 (e.g., which may be the interior of a circle with a center at location L and a radius equal to the uncertainty U) is near to (e.g., within a threshold distance of) or overlaps with an uncertainty area for each of or some of the other UEs (e.g., where an uncertainty area for an other $UE_i$ may be the interior of a circle with a center at location $L_i$ and a radius equal to the uncertainty $U_i$); or (iv) some combination of these apply.

The more the location server 312 is aware of known locations of nearby UEs around the target UE 302, the more likely the verification of the location of the target UE 302 will be reliable. Put another way, it will become more difficult to, for example, spoof the location of the target UE 302 if more reference locations of one or more other UEs (or nodes) are known for cross-checking with the suspected location of the target UE 302. That means, for example, that if the reported location L of the target UE 302 is found to be consistent with the reported or obtained locations of n other UEs as described above for alternatives (i), (ii), (iii) and (iv), then the reported location L can be considered more trustworthy and/or more reliable if the number n of other UEs is large (e.g., n equals 5 or more) rather than if n is small (e.g., n equals 1 or 2).

While the locations of the one or more other UEs alone can contribute to verifying the location provided by a target UE 302 as described above (e.g., to see if such location is spoofed), the location server 312 can validate that location more accurately and reliably using additional sidelink measurements with the other UEs. Such sidelink measurements can include positioning measurements such as AoA and AoD between the target UE 302 and each of the one or more other UEs and measurements that enable a range to be determined between the target UE 302 and each of the one or more other UEs. Range related measurements can include a receive time-transmit time difference (Rx-Tx) obtained by each of two UEs between which a range will be determined. These measurements may be sent to the location server 312 by the target UE 302 in some embodiments or by the one or more other UEs in some embodiments or by both of these in some other embodiments. In some implementations, AoA, AoD and/or ranging measurements may be measured using the sidelink discovery messages, where, as noted above, the sidelink discovery messages may be periodically transmitted by the target UE 302 to the one or more other UEs at the request of the location server 312 or may be periodically transmitted by the one or more other UEs to the target UE 302. Various known approaches to measuring AoA, AoD and/or ranging measurements may be taken to obtain AoA, AoD and/or ranging measurement data by the one or more other UEs and/or by the target UE 302. In some implementations, other measurements useful for localization such as TOA, TDOA and/or RSSI may be measured with the sidelink discovery messages, and/or measurements may be obtained of sidelink signals, such as sidelink PRS, transmitted by the one or more other UEs and/or by the target UE 302. In other implementations, the above measurements may be measured between the target UE 302 and other types of fixed nodes, such as an access point or base station, using downlink or uplink communication as noted above.

Based on some or all of the above information, the location server 312 may estimate a location of the target UE 302 and an uncertainty associated with the estimated location using the reported or obtained locations of the other UEs and the measurements described above. In some embodiments, the location of the UE 302 may be obtained using triangulation based on the AoAs, AoDs, (and associated bearings) and the locations of the one or more other UEs. In some embodiments, multilateration may be used based on, e.g., the locations of the one or more other UEs and ranges (distances) between the target UE 302 and each of (or some of) the other UEs. In some cases, TOA, TDOA, or RSSI measurements may also be used for multilateration.

In some embodiments, the location server 312 may cross-check a location L and/or an uncertainty U provided (e.g., reported) by the target UE 302 with a location L* and an uncertainty U* for the target UE 302 that is determined by the location server 312 as described above (e.g., based on sidelink measurements and known or obtained locations for the other UEs). Here, uncertainty may be a representation of accuracy or likely error (e.g., +/−200 meters from the location). The cross-checking may for example verify that the provided location L is within a threshold distance of the determined location L*. The cross-checking may also or instead be based on an overlap of two areas in which target UE 302 may be located. One area in which the target UE 302 may be located may be the interior of a circle with a center at the reported location L and a radius equal to the reported uncertainty U. Another area in which the UE 302 may be located may be the interior of a circle with a center at the determined location L* and a radius equal to the determined uncertainty U*. The location server 312 may use an uncertainty U where there is high confidence (e.g., 90% or 95%) but not complete confidence (100%) that the target UE 302 is located within the interior of the circle with a center at the reported location L and a radius equal to the uncertainty U. The location server 312 may similarly use or determine an uncertainty U* where there is high confidence (e.g., 90% or 95%) but not complete confidence (100%) that the target UE 302 is also located within the interior of the circle with a center at the location L* and a radius equal to the uncertainty U*. The overlap area between these two circles may represent an area in which the UE 302 can be located that is consistent with both the reported location L and uncertainty U and the location L* and uncertainty U* determined from sideline measurements and locations for the other UEs. If the probability of the UE 302 being inside this overlap area (e.g., based on the UE 302 having the location L* and uncertainty U*) exceeds some threshold (e.g., 5%), the location server 312 may consider the reported location L and uncertainty U as being verified and reliable. Validation of the target UE's 302 location may not be a determination that the location is 100% reliable, but rather, a determination that there is a high probability (e.g., 90%, 99%, 99.9%) that the location of the target UE is accurate (e.g., not spoofed and not erroneous).

In certain implementations, historical data and/or contextual information may also be used to validate the location of the target UE 302. For example, if the provided location of the target UE 302 indicates an area or environment that historically sees many UEs passing by or many UEs moving by at a high speed (e.g., a highway), the location server 312 may request that the target UE 302 determine and report its velocity (e.g., using sensor(s) 740 as described below). The location server 312 may then determine whether the velocity information correlates to known characteristics of the location such as expected speeds (e.g., speed limit of the road), expected directions (e.g., along a highway at the reported location and not transversely to a highway at the reported location) and/or to crowdsourced traffic information at that time (e.g., similar velocity information taken from one or more other UEs at the provided location).

FIGS. 4A-4D illustrate example scenarios that may lead to a validation or no validation of a provided location of the target UE 302 using techniques described previously. In these figures, L and U correspond to the provided (e.g., reported) location and uncertainty of the target UE 302, while L* and U* correspond to the location and uncertainty of the target UE 302 determined by the location server 312 (as described above) based on sidelink measurements and known or obtained locations for other nearby UEs.

In the example of FIG. 4A, the location server 312 may determine that there is an overlap in areas (shown by the shaded area 406) associated with a location L and uncertainty U provided by the target UE 302 and an estimated location L* and estimated uncertainty U* determined using one of the above approaches. The uncertainty U may define a circular area 402 with a radius U around the provided location L, which may be referred to as an uncertainty area for the provided location L. The uncertainty U* may similarly define a circular area 404 with a radius U* around the estimated location L*, which may be referred to as an uncertainty area for the determined location L*. The overlap area 406 may be the intersection of the uncertainty areas 402 and 404. The location server 312 may consider that the higher the amount of overlap area 406, the higher the probability that the target UE 302 is located within this overlap area. In some embodiments, the provided location L of the target UE 302 may be validated if this probability exceeds a probability threshold.

In this example, it can also be seen that the location L provided by the target UE 302 is within the uncertainty area 404 associated with the determined location L* and determined uncertainty U*. Stated another way, the distance between L and L* is smaller than the uncertainty U*. In some embodiments, a distance between L and L* that is smaller than the uncertainty U* (or smaller than some threshold fraction of threshold multiple of U*) may lead to a validation of the provided location L of the target UE 302.

In the example of FIG. 4B, a distance d is determined between the location L provided by the target UE 302 and the location L* of the target UE 302 derived from the information relating to the one or more other UEs. In some embodiments, the provided location L of the target UE 302 may be validated by the location server 312 if d is within a distance threshold. If d is too large (e.g., d exceeds the distance threshold), L may not be validated.

In the example of FIG. 4C, it can be seen that there is no overlap between the uncertainty area 402 defined by the provided location L and uncertainty U and the uncertainty area 404 defined by the determined location L* and uncertainty U*. In such cases, the location server 312 may determine that the location L provided by the target UE 302 cannot be validated. In some cases, however, L may be flagged for further evaluation. For example, it may be that there were initially insufficient nearby UEs to derive an accurate or high-confidence location L* for the target UE 302, but additional nearby UEs may be available for a second cross-check.

In the example of FIG. 4D, it can be seen that there is a small overlap area 407 similar to the FIG. 4A example. However, the locations L and L* are not within the uncertainty areas 404 and 402, respectively, defined by the uncertainties U* and U, respectively. Based on the small amount of overlap 407, the location server 312 may determine that there is a low probability that the target UE 302 is located within this overlap area. Depending on the probability threshold, the provided location L of the target UE 302 may be validated or not validated by the location server 312.

In some embodiments, multiple criteria may be considered in combination. For example, the distance d between the locations L and L* may be compared with a distance threshold. In the FIG. 4D example, the distance d may be or may not be within the distance threshold, and the location server 312 may or may not validate the provided location L of the target UE 302 based thereon.

In some cases, the verification may fail when there is consistent location spoofing by both the target UE 302 and all of the other UEs or there is a third-party GNSS spoofing not detected by any of the UEs. Thus, in some embodiments, verification may only be reliable if there is at least some threshold number of the one or more nearby UEs (e.g., a plurality such as three or more) that provide non-spoofed locations and measurements.

Methods

Figure 5:
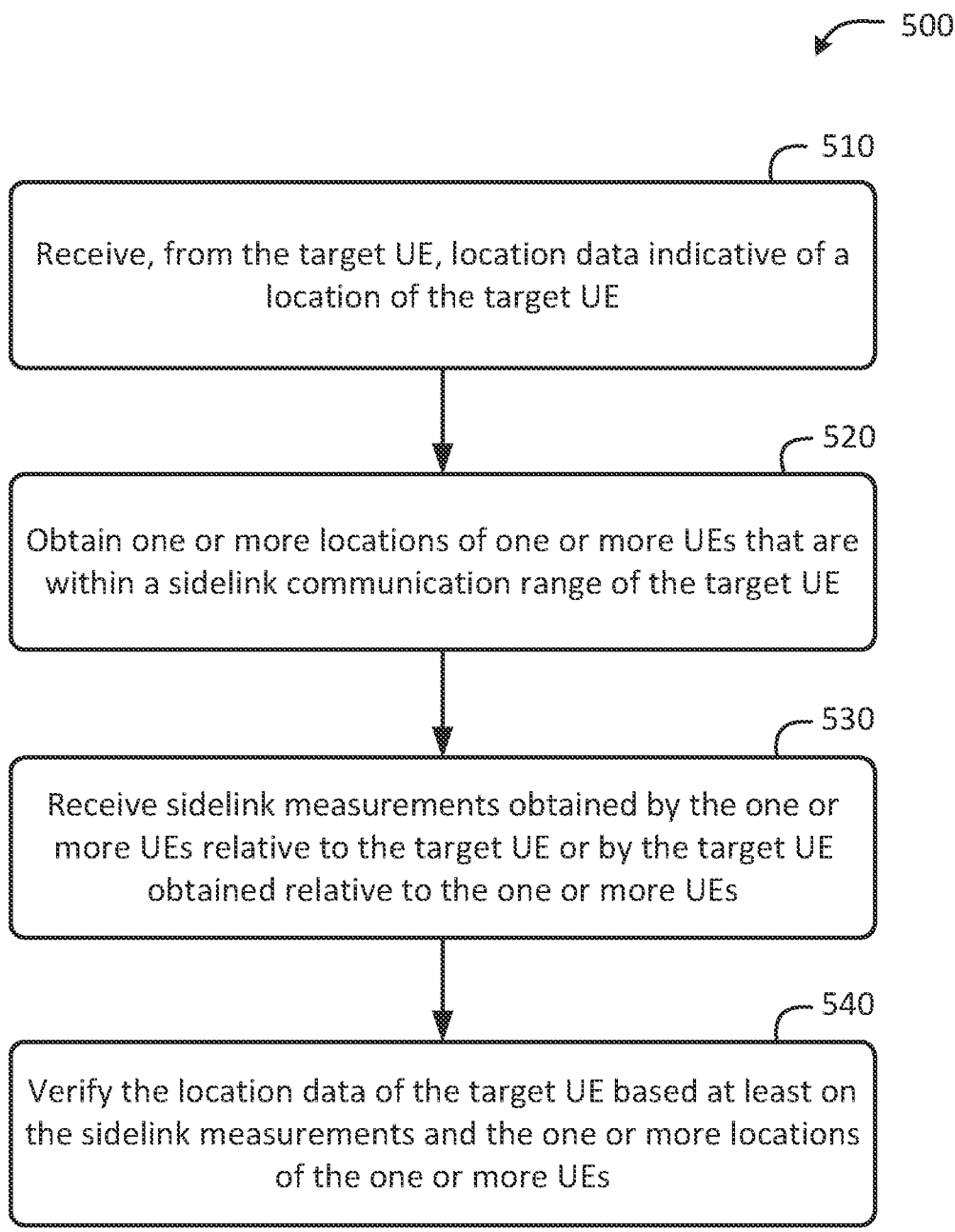
FIG. 5 is a flow diagram of a method of validating a location of a target UE that is configured to access an NTN, according to some embodiments.

FIG. 5 is a flow diagram of a method 500 of validating a location of a target user equipment (UE), such as a UE 105 or target UE 302, that is configured to access a non-terrestrial network (NTN), according to some embodiments. Structure for performing the functionality illustrated in one or more of the blocks shown in FIG. 5 may be performed by hardware and/or software components of a computerized apparatus or system, e.g., a server (e.g., location server 160, LMF 220, location server 312). Components of such computerized apparatus or system may include, for example, a controller apparatus, a computerized system, or a computer-readable apparatus including a storage medium storing computer-readable and/or computer-executable instructions that are configured to, when executed by a processor apparatus, cause the at least one processor apparatus or a computerized apparatus to perform the operations. Example components of a server are illustrated in FIG. 8, which is described in more detail below.

It should also be noted that the operations of the method 500 may be performed in any suitable order, not necessarily the order depicted in FIG. 5. Further, the method 500 may include additional or fewer operations than those depicted in FIG. 5 to validate the location of the target UE.

At block 510, the method 500 may include receiving, from the target UE, location data indicative of a location of the target UE. In some embodiments, the target UE may provide the location data to the server, e.g., using an NTN via at least communication links 211, 307, 308 between target UE 302 and location server 312. In some embodiments, the location data of the target UE may include a provided location of the target UE and/or an uncertainty for the provided location (L and/or U).

Figure 8:
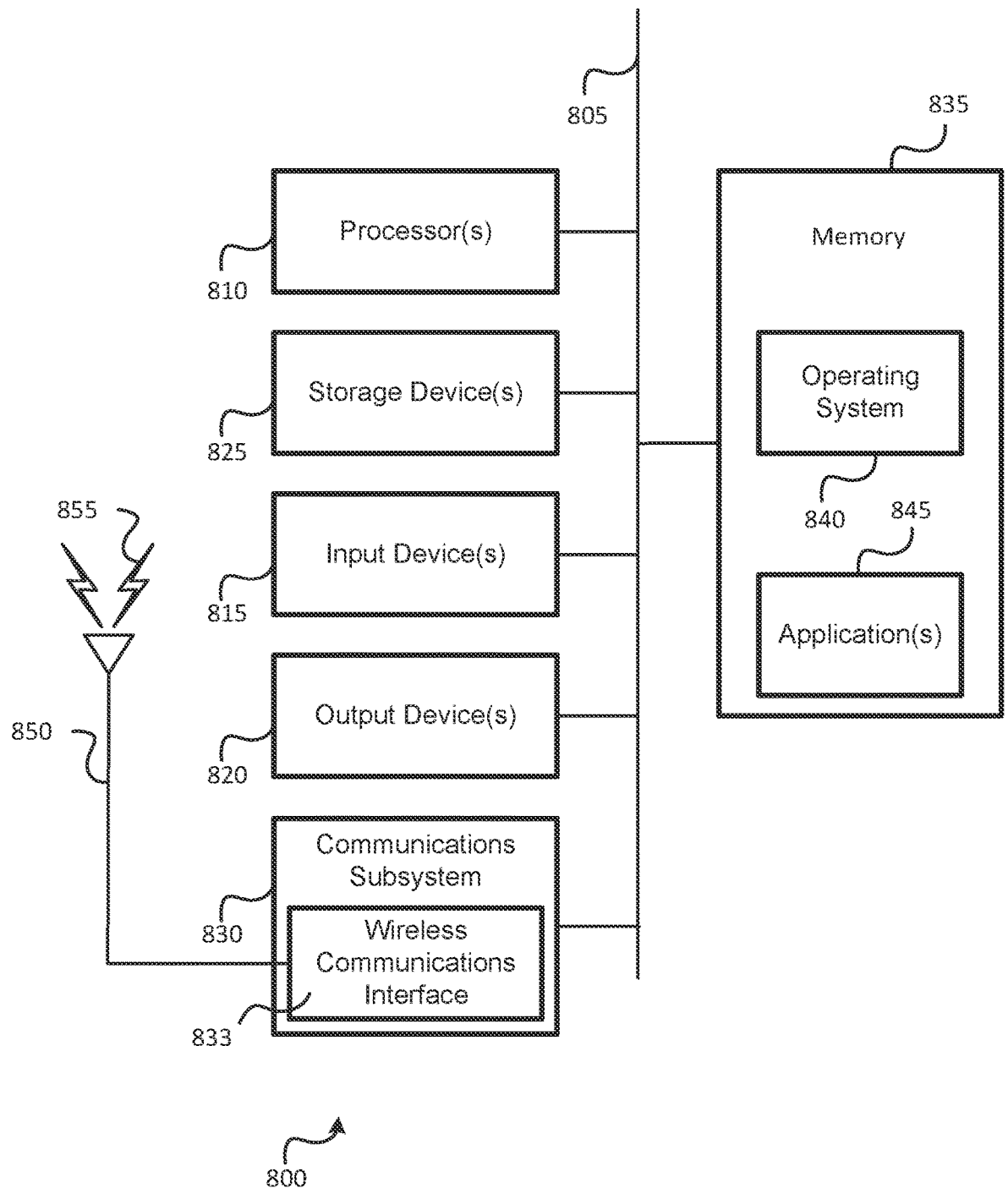
FIG. 8 is a block diagram of an embodiment of a computer system, which can be utilized in embodiments as described herein.

Structure for performing functionality at block 510 may comprise a communications subsystem 830, wireless communication interface 833, and/or other components of the server, as illustrated in FIG. 8.

At block 520, the method 500 may include obtaining one or more locations of one or more UEs that are within a sidelink communication range of the target UE. In some embodiments, the one or more locations of one or more UEs are for known UEs of known or approximate positions. The one or more locations of the one or more UEs may be previously reported locations stored on a location server. In some embodiments, the one or more locations of the one or more UEs may be sent to a location server by the one or more UEs upon request (e.g., using communication link 311 or using the NTN). The one or more UEs may comprise a plurality of UEs within the sidelink communication range of the target UE, a quantity of the plurality of UEs meeting or exceeding a threshold quantity that increases reliability of the location data of the target UE and reduces a probability of location spoofing by the target UE and the plurality of UEs.

Structure for performing functionality at block 520 may comprise storage device(s) 825, a communications subsystem 830, wireless communication interface 833, and/or other components of the server, as illustrated in FIG. 8.

At block 530, the method 500 may include receiving sidelink measurements obtained by the one or more UEs relative to the target UE or by the target UE obtained relative to the one or more UEs. In some embodiments, the sidelink measurements may be made between the target UE and the one or more UEs. According to implementations, the sidelink measurements may include an angle of arrival (AoA), an angle of departure (AoD), a receive time-transmit time difference (Rx-Tx), a range, a direction, a bearing, or a combination thereof. In some embodiments, the sidelink measurements may be reported to the location server by the target UE. In some embodiments, the sidelink measurements may be reported to the location server by the one or more UEs relative to the target UE.

Structure for performing functionality at block 530 may comprise a communications subsystem 830, wireless communication interface 833, and/or other components of the server, as illustrated in FIG. 8.

At block 540, the method 500 may include verifying the location data of the target UE based at least on the sidelink measurements and the one or more locations of the one or more UEs. In some embodiments, the verification of the location data of the target UE may be based on a comparison between the location data of the target UE and derived location information for the target UE, e.g., according to example scenarios FIGS. 4A-4D.

More specifically, prior to the comparison, the location server may derive location information for the target UE based on the sidelink measurements and the one or more locations of the one or more UEs, where the derived location information for the target UE includes an estimated location of the target UE and/or an uncertainty for the estimated location (L* and/or U*). In some implementations, deriving the location information for the target UE may be done using triangulation or multilateration based on the sidelink measurements and the one or more locations of the one or more UEs.

In some implementations, the location data of the target UE may include a provided location of the target UE, and verifying the location data of the target UE may be based on verifying that a distance between the provided location and the estimated location is less than at least one of a threshold, an uncertainty of the provided location, or an uncertainty of the estimated location.

In some implementations, the location data of the target UE may include a provided location of the target UE (L) and an uncertainty for the provided location (U). The comparison may then involve a comparison between (i) the location data of the target UE and the estimated location and an uncertainty for the estimated location (e.g., comparing L, U, L* and U* as in FIGS. 4A, 4C and 4D), (ii) the provided location and the estimated location and the uncertainty for the estimated location (e.g., comparing L, L* and U* as in FIGS. 4A, 4C and 4D), (iii) the location data of the target UE and the estimated location of the target UE (e.g., comparing L, U and L* as in FIGS. 4C and 4D), or (iv) a combination thereof.

In some implementations, the verification of the location data of the target UE may be further based on a probability of the target UE being within an overlap between an uncertainty area for the provided location and an uncertainty area for the estimated location, e.g., whether the probability meets or exceeds a probability threshold (e.g., as discussed for FIGS. 4A and 4D).

In some embodiments, the verification of the location data of the target UE may be further based on contextual information relating to the target UE. Examples of the contextual information may be an area in which the target UE is disposed, a speed of the target UE, a direction of travel of the target UE, historical data relating to one or more UEs in the area, or a combination thereof.

The verification of the location data of the target UE may include verifying a geographic region of the target UE (e.g., country or a regulatory area). This may validate the target UE as likely being in the location that purports to be in (e.g., per the location data).

Structure for performing functionality at block 540 may comprise processor(s) 810, memory 835, and/or other components of the server, as illustrated in FIG. 8.

Figure 6A:
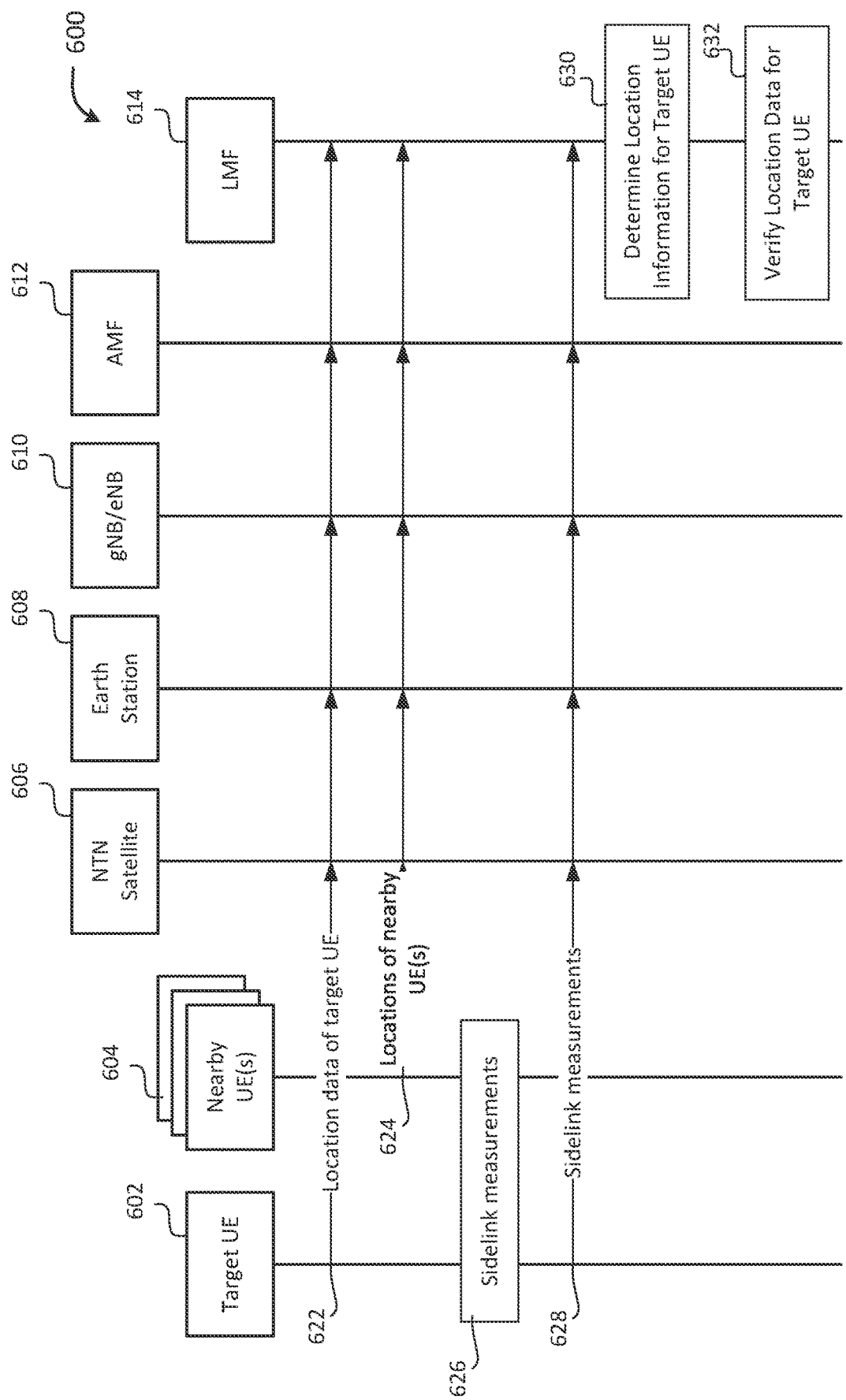
FIGS. 6A and 6B are call flow diagrams depicting exchange of signals between a target UE, one or more other UE(s), and a Location Management Function (LMF), according to embodiments.
Figure 6B:
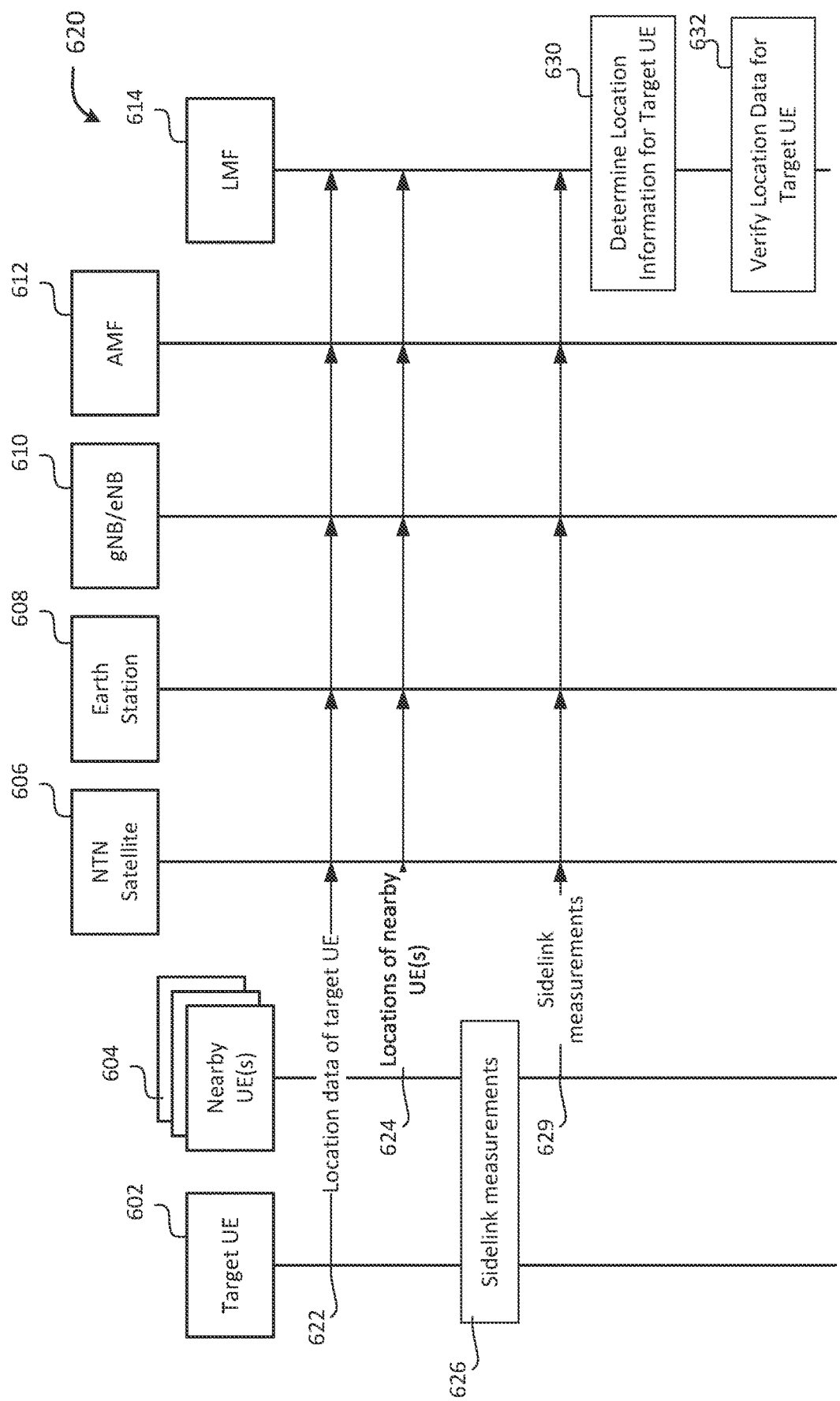

FIGS. 6A and 6B are signaling flow diagram 600 and 620 that depicts various signals and/or messages exchanged between one or more UEs and other components of a positioning system that supports NTN-based access and positioning (such as that shown in FIGS. 1 and 2), according to some embodiments. Signals and/or messages may be exchanged among a target UE 602, one or more other nearby UEs 604, one or more NTN satellite(s) 606, one or more earth station(s) 608 configured for communication with the one or more NTN satellite(s) 606, one or more gNB(s) or eNB(s) 610, an AMF 612, and an LMF 614 configured for data communication with the foregoing entities. The target UE 602 may be an example of UE 105 of FIG. 1 or 2, or target UE 302 of FIG. 3. The one or more nearby UEs 604 may be examples of one or more of UEs 308 of FIG. 3, which may be within sidelink communication range from the target UE 602. The LMF 614 may be an example of the LMF 220 shown in FIG. 2. In some embodiments, each of the gNB/eNB(s) 610 may be an example of gNBs 210-1 or 210-2 or ng-eNB 214 of an NG-RAN as shown in FIG. 2.

As depicted in FIGS. 6A and 6B and as will become apparent in the discussion below, an NTN satellite 606, earth station 608, gNB/eNB 610, and/or AMF 612 are intermediate entities that may be transparent to the signals and/or messages exchanged between, e.g., either target UE 602 or UEs 604 and LMF 614. That is, one or more of the intermediate entities may serve to relay or forward the signals and/or messages to carry out operations 622-629.

At 622, the target UE 602 may send location data to the LMF 614. In some embodiments, the location data may be indicative of a location of the target UE 602. In some implementations, the location data may be relayed to the LMF 614 via the NTN satellite(s) 606, earth station(s) 608, gNB/eNB 610, and AMF 612. The location data may include a location of the target UE 602 and/or an uncertainty of the location of the target UE 602.

At 624, one or more nearby UEs 604 may send their locations to the LMF 614. In some implementations, the location information may be relayed to the LMF 614 via the NTN satellite(s) 606, earth station(s) 608, gNB/eNB 610, and AMF 612. In some implementations, e.g., where base station access is available to the one or more other UEs, the gNB/eNB 610 and AMF 612 (and/or other components of the NG-RAN not shown) may relay the location information to the LMF 614. In some cases, however, the locations of the one or more UEs may be known locations previously reported to the LMF 614, and 624 may not be performed. In some implementations, LMF 614 may obtain the locations of one or more nearby UEs 604 at 624 by employing a position method or position methods to locate each of the one or more nearby UEs 604, in which case UEs 604 may just send location information to the LMF 614 that enables the locations to be obtained by LMF 614.

At 626, the target UE 602 and/or the one or more nearby UEs 604 may transmit (e.g., broadcast) discovery messages and/or sidelink signals (e.g., sidelink PRS) that enable the target UE 602 and/or the one or more nearby UEs 604 to perform sidelink measurements relative to one other. For example, sidelink measurements may be obtained by the one or more nearby UEs 604 relative to the target UE 602. As another example, sidelink measurements may be obtained by the target UE 602 relative to the one or more nearby UEs 604.

In some embodiments, at 628 shown in FIG. 6A, the target UE 602 may send the sidelink measurements obtained at 626 to the LMF 614. In some implementations, the sidelink measurements may be relayed to the LMF 614 via the NTN satellite(s) 606, earth station(s) 608, gNB/eNB 610, and AMF 612.

In some embodiments, at 629 shown in FIG. 6B, the one or more nearby UEs 604 may send the sidelink measurements obtained at 626 to the LMF 614. In some implementations, the sidelink measurements may be relayed to the LMF 614 via the NTN satellite(s) 606, earth station(s) 608, gNB/eNB 610, and AMF 612. In some implementations, the gNB/eNB 610 and AMF 612 may relay the sidelink measurements to the LMF 614. In some implementations, 622, 624, and 626 shown in FIG. 6B may correspond to those shown in FIG. 6A.

In some embodiments, at 630 shown in FIGS. 6A and 6B, LMF 614 may determine location information for the target UE 602 based on the sidelink measurements received at 628 and/or at 629 and the locations of nearby UEs 604 obtained at (or prior to) 624. For example, the location information for the target UE 602 may include an estimated location for the target UE 602 and/or an uncertainty of the estimated location for the target UE 602, as described for FIGS. 4 and 5.

In some embodiments, at 632 shown in FIGS. 6A and 6B. LMF 614 may verify the location data provided (or reported) by the target UE 602 at 622 based on the location information for the target UE 602 determined at 630. For example, the LMF 614 may verify a reported location of the target UE 602 as described for FIGS. 3, 4 and 5.

In some embodiments, the signal flow diagrams 600 and 620 may represent signals and/or messages exchanged to implement the method 500 of FIG. 5.

Apparatus

Figure 7:
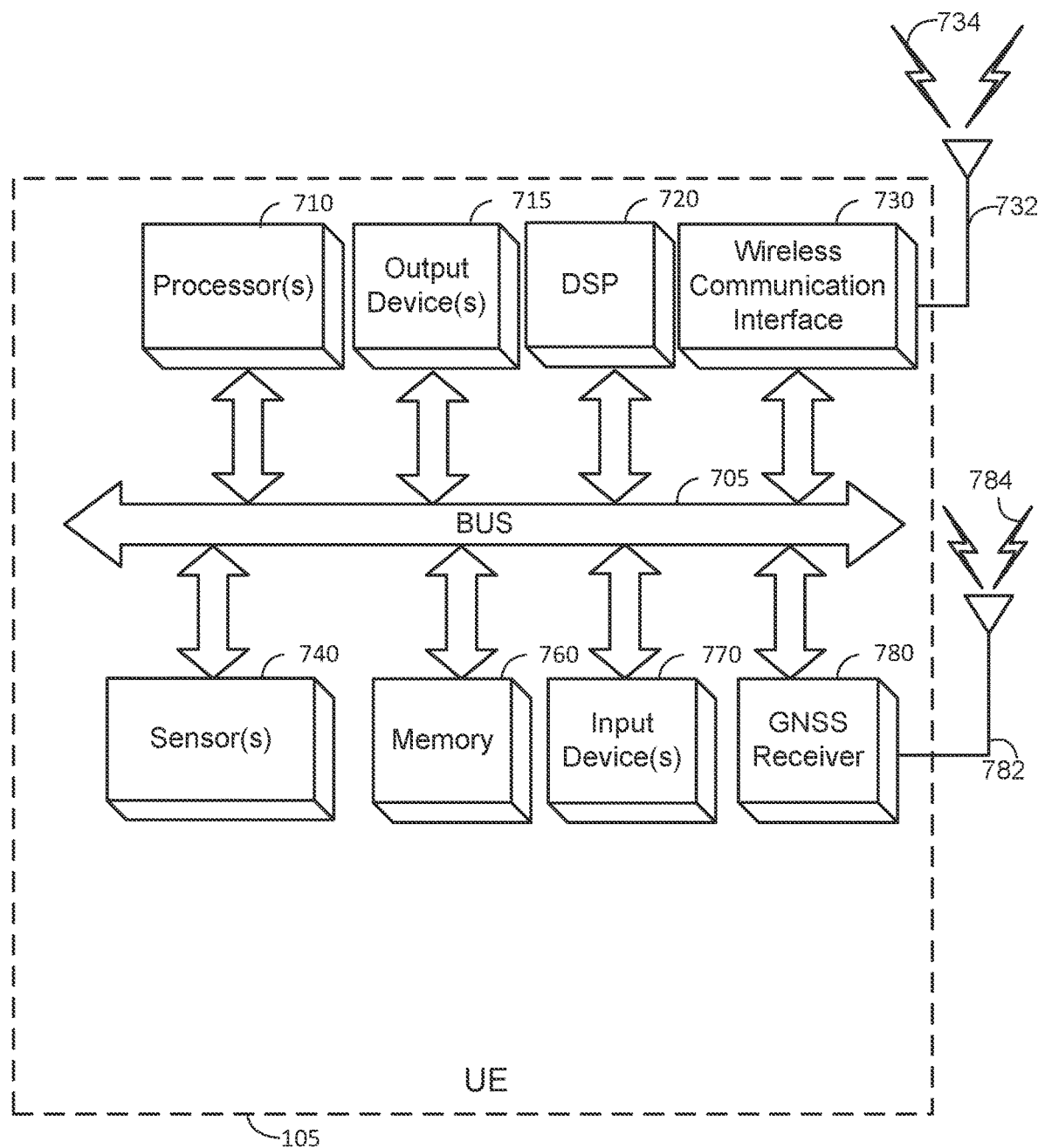
FIG. 7 is a block diagram of an embodiment of a UE, which can be utilized in embodiments as described herein.

FIG. 7 is a block diagram of an embodiment of a UE 105, which can be utilized as described herein above (e.g., in association with FIGS. 3 and 6). For example, the UE 105 can enable one or more of the functions of the method shown in FIG. 5, e.g., such that a location server may receive location data of a target UE. The UE 105 in FIG. 7 may also correspond to one of the other UEs 145, 308 and 604 shown in FIGS. 1, 3 and 6, respectively. The UE 105 may perform sidelink communications with another UE using a wireless communication interface 730. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations. Furthermore, as previously noted, the functionality of the UEs discussed in the previously described embodiments may be executed by one or more of the hardware and/or software components illustrated in FIG. 7.

The UE 105 is shown comprising hardware elements that can be electrically coupled via a bus 705 (or may otherwise be in communication, as appropriate). The hardware elements may include a processor(s) 710 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 710 may comprise one or more processing units, which may be housed in a single integrated circuit (IC) or multiple ICs. As shown in FIG. 7, some embodiments may have a separate DSP 720, depending on desired functionality. Location determination and/or other determinations based on wireless communication may be provided in the processor(s) 710 and/or wireless communication interface 730 (discussed below). The UE 105 also can include one or more input devices 770, which can include without limitation one or more keyboards, touch screens, touch pads, microphones, buttons, dials, switches, and/or the like; and one or more output devices 715, which can include without limitation one or more displays (e.g., touch screens), light emitting diodes (LEDs), speakers, and/or the like.

The UE 105 may also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 730 may permit data and signaling to be communicated (e.g., transmitted and received) with NTN satellites and/or TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 732 that send and/or receive wireless signals 734. According to some embodiments, the wireless communication antenna(s) 732 may comprise a plurality of discrete antennas, antenna arrays, or any combination thereof. The antenna(s) 732 may be capable of transmitting and receiving wireless signals using beams (e.g., Tx beams and Rx beams). Beam formation may be performed using digital and/or analog beam formation techniques, with respective digital and/or analog circuitry. The wireless communication interface 730 may include such circuitry.

Depending on desired functionality, the wireless communication interface 730 may comprise a separate receiver and transmitter, or any combination of transceivers, transmitters, and/or receivers to communicate with NTN satellites, base stations (e.g., ng-eNBs and gNBs) and other terrestrial transceivers, such as wireless devices and access points. The UE 105 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 740. Sensor(s) 740 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 780 capable of receiving signals 784 from one or more GNSS satellites using an antenna 782 (which could be the same as antenna 732). Positioning based on GNSS signal measurement can be utilized to complement and/or incorporate the techniques described herein. The GNSS receiver 780 can extract a position of the UE 105, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 780 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 780 is illustrated in FIG. 7 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 710, DSP 720, and/or a processor within the wireless communication interface 730 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 710 or DSP 720.

The UE 105 may further include and/or be in communication with a memory 760. The memory 760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 760 of the UE 105 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the UE 105 (and/or processor(s) 710 or DSP 720 within UE 105). In some embodiments, then, such code and/or instructions can be used to configure and/or adapt a general-purpose computer (or other device) to perform one or more operations in accordance with the described methods.

FIG. 8 is a block diagram of an embodiment of a computer system 800, which may be used, in whole or in part, to provide the functions of one or more network components as described in the embodiments herein (e.g., location server 160 of FIG. 1, LMF 220 of FIG. 2 or AMF 215 of FIG. 2). In addition, the computer system 800 may perform one or more of the functions of the method shown in FIG. 5. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different geographical locations.

The computer system 800 is shown comprising hardware elements that can be electrically coupled via a bus 805 (or may otherwise be in communication, as appropriate). The hardware elements may include processor(s) 810, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 800 also may comprise one or more input devices 815, which may comprise without limitation a mouse, a keyboard, a camera, a microphone, and/or the like; and one or more output devices 820, which may comprise without limitation a display device, a printer, and/or the like.

The computer system 800 may further include (and/or be in communication with) one or more non-transitory storage devices 825, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 800 may also include a communications subsystem 830, which may comprise wireless communication technologies managed and controlled by a wireless communication interface 833, as well as wired technologies (such as Ethernet, coaxial communications, universal serial bus (USB), and the like). The wireless communication interface 833 may comprise one or more wireless transceivers that may send and receive wireless signals 855 (e.g., signals according to 5G NR or LTE) via wireless antenna(s) 850. Thus the communications subsystem 830 may comprise a modem, a network card (wireless or wired), an infrared communication device, a wireless communication device, and/or a chipset, and/or the like, which may enable the computer system 800 to communicate on any or all of the communication networks described herein to any device on the respective network, including a User Equipment (UE), base stations and/or other TRPs, and/or any other electronic devices described herein. Hence, the communications subsystem 830 may be used to receive and send data as described in the embodiments herein.

In many embodiments, the computer system 800 will further comprise a working memory 835, which may comprise a RAM or ROM device, as described above. Software elements, shown as being located within the working memory 835, may comprise an operating system 840, device drivers, executable libraries, and/or other code, such as one or more applications 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of validating a location of a target user equipment (UE) that is configured to access a non-terrestrial network (NTN), the method comprising: receiving, from the target UE, location data indicative of a location of the target UE; obtaining one or more locations of one or more UEs that are within a sidelink communication range of the target UE; receiving sidelink measurements obtained by the one or more UEs relative to the target UE or by the target UE obtained relative to the one or more UEs; and verifying the location data of the target UE based at least on the sidelink measurements and the one or more locations of the one or more UEs.

Clause 2: The method of clause 1, wherein: the sidelink measurements comprise an angle of arrival (AoA), an angle of departure (AoD), a receive time-transmit time difference (Rx-Tx), a range, a direction, a bearing, or a combination thereof; and the sidelink measurements are made between the target UE and the one or more UEs.

Clause 3: The method of any one of clauses 1-2 further comprising deriving location information for the target UE based on the sidelink measurements and the one or more locations of the one or more UEs, the derived location information for the target UE comprising an estimated location of the target UE, an uncertainty for the estimated location, or both of these; wherein the verifying of the location data of the target UE is based on a comparison between the location data of the target UE and the derived location information for the target UE.

Clause 4: The method of any one of clauses 1-3 wherein the location data of the target UE comprises a provided location of the target UE; and the verifying of the location data of the target UE is based on verifying that a distance between the provided location and the estimated location is less than at least one of a threshold, an uncertainty of the provided location, or an uncertainty of the estimated location.

Clause 5: The method of any one of clauses 1-4 wherein the location data of the target UE comprises a provided location of the target UE and an uncertainty for the provided location; and the comparison comprises a comparison between (i) the location data of the target UE and the estimated location and an uncertainty for the estimated location, (ii) the provided location and the estimated location and the uncertainty for the estimated location, (iii) the location data of the target UE and the estimated location of the target UE, or (iv) a combination thereof.

Clause 6: The method of any one of clauses 1-5 wherein the verifying of the location data of the target UE is further based on a probability of the target UE being within an overlap between an uncertainty area for the provided location and an uncertainty area for the estimated location.

Clause 7: The method of any one of clauses 1-6 further comprising deriving the location information for the target UE using triangulation or multilateration based on the sidelink measurements and the one or more locations of the one or more UEs.

Clause 8: The method of any one of clauses 1-7 wherein the one or more UEs comprise a plurality of UEs within the sidelink communication range of the target UE, a quantity of the plurality of UEs meeting or exceeding a threshold quantity that increases reliability of the location data of the target UE and reduces a probability of location spoofing by the target UE and the plurality of UEs.

Clause 9: The method of any one of clauses 1-8 wherein the verifying of the location data of the target UE comprises verifying a geographic region of the target UE.

Clause 10: The method of any one of clauses 1-9 wherein the verifying of the location data of the target UE is further based on contextual information relating to the target UE, the contextual information comprising an area in which the target UE is disposed, a speed of the target UE, a direction of travel of the target UE, historical data relating to one or more UEs in the area, or a combination thereof.

Clause 11: An apparatus comprising: one or more transceivers configured to communicate with a target user equipment (UE); memory; and one or more processors communicatively coupled to the one or more transceivers and the memory, and configured to: receive location data of the target UE; obtain one or more locations of one or more UEs that are within a sidelink communication range of the target UE; receive sidelink measurements obtained by the one or more UEs relative to the target UE or by the target UE obtained for the one or more UEs; and verify the location data of the target UE based at least on the sidelink measurements and the one or more locations of the one or more UEs.

Clause 12: The apparatus of clause 11, wherein: the sidelink measurements comprise an angle of arrival (AoA), an angle of departure (AoD), a receive time-transmit time difference (Rx-Tx), a range, a direction, a bearing, or a combination thereof; and the sidelink measurements are made between the target UE and the one or more UEs.

Clause 13: The apparatus of any one of clauses 11-12 wherein the one or more processors are further configured to derive location information for the target UE based on the sidelink measurements and the one or more locations of the one or more UEs, the derived location information for the target UE comprising an estimated location of the target UE, an uncertainty for the estimated location, or both of these; and wherein the verification of the location data of the target UE is based on a comparison between the location data of the target UE and the derived location information for the target UE.

Clause 14: The apparatus of any one of clauses 11-13 wherein the location data of the target UE comprises a provided location of the target UE; and the verification of the location data of the target UE is based on verifying that a distance between the provided location and the estimated location is less than at least one of a threshold, an uncertainty of the provided location, or an uncertainty of the estimated location.

Clause 15: The apparatus of any one of clauses 11-14 wherein the location data of the target UE comprises a provided location of the target UE and an uncertainty for the provided location; and the comparison comprises a comparison between (i) the location data of the target UE and the estimated location and an uncertainty for the estimated location, (ii) the provided location and the estimated location and the uncertainty for the estimated location, (iii) the location data of the target UE and the estimated location of the target UE, or (iv) a combination thereof.

Clause 16: The apparatus of any one of clauses 11-15 wherein the verification of the location data of the target UE is further based on a probability of the target UE being within an overlap between an uncertainty area for the provided location and an uncertainty area for the estimated location.

Clause 17: The apparatus of any one of clauses 11-16 wherein the one or more processors are further configured to derive the location information for the target UE using triangulation or multilateration based on the sidelink measurements and the one or more locations of the one or more UEs.

Clause 18: The apparatus of any one of clauses 11-17 wherein the one or more UEs comprise a plurality of UEs within the sidelink communication range of the target UE, a quantity of the plurality of UEs meeting or exceeding a threshold quantity that increases reliability of the location data of the target UE and reduces a probability of location spoofing by the target UE and the plurality of UEs.

Clause 19: The apparatus of any one of clauses 11-18 wherein the verification of the location data of the target UE comprises verifying a geographic region of the target UE.

Clause 20: The apparatus of any one of clauses 11-19 wherein the verification of the location data of the target UE is further based on contextual information relating to the target UE, the contextual information comprising an area in which the target UE is disposed, a speed of the target UE, a direction of travel of the target UE, historical data relating to one or more UEs in the area, or a combination thereof.

Clause 21: A non-transitory computer-readable apparatus comprising a storage medium, the storage medium comprising a plurality of instructions configured to, when executed by one or more processors, cause a computerized apparatus to: receive location data of a target user equipment (UE); obtain one or more locations of one or more UEs that are within a sidelink communication range of the target UE; receive sidelink measurements obtained by the one or more UEs relative to the target UE or by the target UE obtained for the one or more UEs; and verify the location data of the target UE based at least on the sidelink measurements and the one or more locations of the one or more UEs.

Clause 22: The non-transitory computer-readable apparatus of clause 21, wherein: the sidelink measurements comprise an angle of arrival (AoA), an angle of departure (AoD), a receive time-transmit time difference (Rx-Tx), a range, a direction, a bearing, or a combination thereof; and the sidelink measurements are made between the target UE and the one or more UEs.

Clause 23: The non-transitory computer-readable apparatus of any one of clauses 21-22 wherein the plurality of instructions are further configured to cause the computerized apparatus to derive location information for the target UE based on the sidelink measurements and the one or more locations of the one or more UEs, the derived location information for the target UE comprising an estimated location of the target UE, an uncertainty for the estimated location, or both of these; and wherein the verification of the location data of the target UE is based on a comparison between the location data of the target UE and the derived location information for the target UE.

Clause 24: The non-transitory computer-readable apparatus of any one of clauses 21-23 wherein the location data of the target UE comprises a provided location of the target UE; and the verification of the location data of the target UE is based on verifying that a distance between the provided location and the estimated location is less than at least one of a threshold, an uncertainty of the provided location, or an uncertainty of the estimated location.

Clause 25: The non-transitory computer-readable apparatus of any one of clauses 21-24 wherein the location data of the target UE comprises a provided location of the target UE and an uncertainty for the provided location; and the comparison comprises a comparison between (i) the location data of the target UE and the estimated location and an uncertainty for the estimated location, (ii) the provided location and the estimated location and the uncertainty for the estimated location, (iii) the location data of the target UE and the estimated location of the target UE, or (iv) a combination thereof.

Clause 26: The non-transitory computer-readable apparatus of any one of clauses 21-25 wherein the verification of the location data of the target UE is further based on a probability of the target UE being within an overlap between an uncertainty area for the provided location and an uncertainty area for the estimated location.

Clause 27: The non-transitory computer-readable apparatus of any one of clauses 21-26 wherein the verification of the location data of the target UE comprises verifying a geographic region of the target UE.

Clause 28: An apparatus comprising: means for receiving location data of a target user equipment (UE); means for obtaining one or more locations of one or more UEs that are within a sidelink communication range of the target UE; means for receiving sidelink measurements obtained by the one or more UEs relative to the target UE or by the target UE obtained for the one or more UEs; and means for verifying the location data of the target UE based at least on the sidelink measurements and the one or more locations of the one or more UEs.

Clause 29: The apparatus of clause 28, wherein: the sidelink measurements comprise an angle of arrival (AoA), an angle of departure (AoD), a receive time-transmit time difference (Rx-Tx), a range, a direction, a bearing, or a combination thereof; and the sidelink measurements are made between the target UE and the one or more UEs.

Clause 30: The apparatus of any one of clauses 28-29 wherein the means for verifying the location data of the target UE comprises means for verifying a geographic region of the target UE.

What is claimed is:

1. A method of validating a location of a target user equipment (UE) that is configured to access a non-terrestrial network (NTN), the method comprising:
   receiving, from the target UE, location data indicative of a location of the target UE;
   obtaining one or more locations of one or more UEs that are within a sidelink communication range of the target UE;
   receiving sidelink measurements obtained by the one or more UEs relative to the target UE or by the target UE obtained relative to the one or more UEs; and
   verifying the location data received from the target UE based at least on derived location information for the target UE, the derived location information including at least an estimated location of the target UE determined based on the sidelink measurements and the one or more locations of the one or more UEs.

2. The method of claim 1, wherein:
   the sidelink measurements comprise an angle of arrival (AoA), an angle of departure (AoD), a receive time-transmit time difference (Rx-Tx), a range, a direction, a bearing, or a combination thereof; and
   the sidelink measurements are made between the target UE and the one or more UEs.

3. The method of claim 1, wherein the derived location information for the target UE further includes an uncertainty for the estimated location; and
   wherein the verifying of the location data of the target UE is based on a comparison between the location data of the target UE and the derived location information for the target UE.

4. The method of claim 3, wherein:
   the location data of the target UE comprises a provided location of the target UE; and
   the verifying of the location data of the target UE is based on verifying that a distance between the provided location and the estimated location is less than at least one of a threshold, an uncertainty of the provided location, or an uncertainty of the estimated location.

5. The method of claim 3, wherein:
the location data of the target UE comprises a provided location of the target UE and an uncertainty for the provided location; and
the comparison comprises a comparison between (i) the location data of the target UE and the estimated location and the uncertainty for the estimated location, (ii) the provided location and the estimated location and the uncertainty for the estimated location, (iii) the location data of the target UE and the estimated location of the target UE, or (iv) a combination thereof.

6. The method of claim 5, wherein the verifying of the location data of the target UE is further based on a probability of the target UE being within an overlap between an uncertainty area for the provided location and an uncertainty area for the estimated location.

7. The method of claim 3, further comprising deriving the location information for the target UE using triangulation or multilateration based on the sidelink measurements and the one or more locations of the one or more UEs.

8. The method of claim 1, wherein the one or more UEs comprise a plurality of UEs within the sidelink communication range of the target UE, a quantity of the plurality of UEs meeting or exceeding a threshold quantity that increases reliability of the location data of the target UE and reduces a probability of location spoofing by the target UE and the plurality of UEs.

9. The method of claim 1, wherein the verifying of the location data of the target UE comprises verifying a geographic region of the target UE.

10. The method of claim 1, wherein the verifying of the location data of the target UE is further based on contextual information relating to the target UE, the contextual information comprising an area in which the target UE is disposed, a speed of the target UE, a direction of travel of the target UE, historical data relating to one or more UEs in the area, or a combination thereof.

11. An apparatus comprising:
one or more transceivers configured to communicate with a target user equipment (UE);
memory; and
one or more processors communicatively coupled to the one or more transceivers and the memory, and configured to:
receive location data of the target UE;
obtain one or more locations of one or more UEs that are within a sidelink communication range of the target UE;
receive sidelink measurements obtained by the one or more UEs relative to the target UE or by the target UE obtained for the one or more UEs; and
verify the location data received from the target UE based at least on derived location information for the target UE, the derived location information including at least an estimated location of the target UE determined based on the sidelink measurements and the one or more locations of the one or more UEs.

12. The apparatus of claim 11, wherein:
the sidelink measurements comprise an angle of arrival (AoA), an angle of departure (AoD), a receive time-transmit time difference (Rx-Tx), a range, a direction, a bearing, or a combination thereof; and
the sidelink measurements are made between the target UE and the one or more UEs.

13. The apparatus of claim 11, wherein the derived location information for the target UE further includes an uncertainty for the estimated location; and
wherein the verification of the location data of the target UE is based on a comparison between the location data of the target UE and the derived location information for the target UE.

14. The apparatus of claim 13, wherein:
the location data of the target UE comprises a provided location of the target UE; and
the verification of the location data of the target UE is based on verifying that a distance between the provided location and the estimated location is less than at least one of a threshold, an uncertainty of the provided location, or an uncertainty of the estimated location.

15. The apparatus of claim 13, wherein:
the location data of the target UE comprises a provided location of the target UE and an uncertainty for the provided location; and
the comparison comprises a comparison between (i) the location data of the target UE and the estimated location and the uncertainty for the estimated location, (ii) the provided location and the estimated location and the uncertainty for the estimated location, (iii) the location data of the target UE and the estimated location of the target UE, or (iv) a combination thereof.

16. The apparatus of claim 15, wherein the verification of the location data of the target UE is further based on a probability of the target UE being within an overlap between an uncertainty area for the provided location and an uncertainty area for the estimated location.

17. The apparatus of claim 13, wherein the one or more processors are further configured to derive the location information for the target UE using triangulation or multilateration based on the sidelink measurements and the one or more locations of the one or more UEs.

18. The apparatus of claim 11, wherein the one or more UEs comprise a plurality of UEs within the sidelink communication range of the target UE, a quantity of the plurality of UEs meeting or exceeding a threshold quantity that increases reliability of the location data of the target UE and reduces a probability of location spoofing by the target UE and the plurality of UEs.

19. The apparatus of claim 11, wherein the verification of the location data of the target UE comprises verifying a geographic region of the target UE.

20. The apparatus of claim 11, wherein the verification of the location data of the target UE is further based on contextual information relating to the target UE, the contextual information comprising an area in which the target UE is disposed, a speed of the target UE, a direction of travel of the target UE, historical data relating to one or more UEs in the area, or a combination thereof.

21. A non-transitory computer-readable apparatus comprising a storage medium, the storage medium comprising a plurality of instructions configured to, when executed by one or more processors, cause a computerized apparatus to:
receive location data of a target user equipment (UE);
obtain one or more locations of one or more UEs that are within a sidelink communication range of the target UE;
receive sidelink measurements obtained by the one or more UEs relative to the target UE or by the target UE obtained for the one or more UEs; and
verify the location data received from the target UE based at least on derived location information for the target UE, the derived location information including at least an estimated location of the target UE determined based on the sidelink measurements and the one or more locations of the one or more UEs.

22. The non-transitory computer-readable apparatus of claim 21, wherein:
- the sidelink measurements comprise an angle of arrival (AoA), an angle of departure (AoD), a receive time-transmit time difference (Rx-Tx), a range, a direction, a bearing, or a combination thereof; and
- the sidelink measurements are made between the target UE and the one or more UEs.

23. The non-transitory computer-readable apparatus of claim 21, wherein the derived location information for the target UE further includes an uncertainty for the estimated location; and
- wherein the verification of the location data of the target UE is based on a comparison between the location data of the target UE and the derived location information for the target UE.

24. The non-transitory computer-readable apparatus of claim 23, wherein:
- the location data of the target UE comprises a provided location of the target UE; and
- the verification of the location data of the target UE is based on verifying that a distance between the provided location and the estimated location is less than at least one of a threshold, an uncertainty of the provided location, or an uncertainty of the estimated location.

25. The non-transitory computer-readable apparatus of claim 23, wherein:
- the location data of the target UE comprises a provided location of the target UE and an uncertainty for the provided location; and
- the comparison comprises a comparison between (i) the location data of the target UE and the estimated location and the uncertainty for the estimated location, (ii) the provided location and the estimated location and the uncertainty for the estimated location, (iii) the location data of the target UE and the estimated location of the target UE, or (iv) a combination thereof.

26. The non-transitory computer-readable apparatus of claim 25, wherein the verification of the location data of the target UE is further based on a probability of the target UE being within an overlap between an uncertainty area for the provided location and an uncertainty area for the estimated location.

27. The non-transitory computer-readable apparatus of claim 21, wherein the verification of the location data of the target UE comprises verifying a geographic region of the target UE.

28. An apparatus comprising:
- means for receiving location data from a target user equipment (UE);
- means for obtaining one or more locations of one or more UEs that are within a sidelink communication range of the target UE;
- means for receiving sidelink measurements obtained by the one or more UEs relative to the target UE or by the target UE obtained for the one or more UEs; and
- means for verifying the location data received from the target UE based at least on derived location information for the target UE, the derived location information including at least an estimated location of the target UE determined based on the sidelink measurements and the one or more locations of the one or more UEs.

29. The apparatus of claim 28, wherein:
- the sidelink measurements comprise an angle of arrival (AoA), an angle of departure (AoD), a receive time-transmit time difference (Rx-Tx), a range, a direction, a bearing, or a combination thereof; and
- the sidelink measurements are made between the target UE and the one or more UEs.

30. The apparatus of claim 28, wherein the means for verifying the location data of the target UE comprises means for verifying a geographic region of the target UE.

* * * * *